(12) United States Patent
You

(10) Patent No.: US 10,838,177 B2
(45) Date of Patent: *Nov. 17, 2020

(54) LENS MODULE

(71) Applicant: Samsung Electro-Mechanics Co., Ltd., Suwon-si (KR)

(72) Inventor: Ho Sik You, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,823

(22) Filed: Oct. 9, 2019

(65) Prior Publication Data

US 2020/0041768 A1 Feb. 6, 2020

Related U.S. Application Data

(63) Continuation of application No. 16/185,071, filed on Nov. 9, 2018, now Pat. No. 10,481,369, which is a continuation of application No. 14/974,997, filed on Dec. 18, 2015, now Pat. No. 10,215,959.

(30) Foreign Application Priority Data

Dec. 19, 2014 (KR) .................. 10-2014-0184401

(51) Int. Cl.
*G02B 13/18* (2006.01)
*G02B 3/02* (2006.01)
*G02B 13/00* (2006.01)

(52) U.S. Cl.
CPC ............... *G02B 13/0045* (2013.01)

(58) Field of Classification Search
CPC ...... G02B 13/0045; G02B 9/62; G02B 5/208; G02B 13/18; G02B 3/04; G02B 13/04; G02B 13/24; G02B 27/0025; G02B 7/028
See application file for complete search history.

(56) References Cited

U.S. PATENT DOCUMENTS

| 8,477,431 | B2 | 7/2013 | Huang |
| 8,780,464 | B2 | 7/2014 | Huang |
| 9,176,300 | B2 | 11/2015 | Chen et al. |
| 9,279,958 | B2 | 3/2016 | Noda et al. |
| 2009/0296234 | A1 | 12/2009 | Asami |

(Continued)

FOREIGN PATENT DOCUMENTS

| CN | 202975455 U | 6/2013 |
| CN | 203882004 U | 10/2014 |

(Continued)

OTHER PUBLICATIONS

Korean Office Action dated Sep. 26, 2016 in corresponding Korean Patent Application No. 10-2014-0184401.

(Continued)

*Primary Examiner* — Alicia M Harrington
(74) *Attorney, Agent, or Firm* — NSIP Law

(57) ABSTRACT

A lens module includes a first lens, a second lens, and a third lens comprising a convex object-side surface and a convex image-side surface. The lens module also includes a fourth lens including a concave object-side surface and a concave image-side surface, a fifth lens including a concave object-side surface, and a sixth lens including an inflection point formed on an image-side surface thereof. The first to sixth lenses are sequentially disposed from an object side to an image side.

21 Claims, 30 Drawing Sheets

(56) References Cited

U.S. PATENT DOCUMENTS

| | | |
|---|---|---|
| 2010/0085651 A1 | 4/2010 | Asami |
| 2013/0120858 A1 | 5/2013 | Sano |
| 2013/0342918 A1 | 12/2013 | Kubota et al. |
| 2014/0118844 A1 | 5/2014 | Tsai et al. |
| 2014/0368931 A1 | 12/2014 | Noda et al. |
| 2015/0268446 A1 | 9/2015 | Chen et al. |
| 2016/0178871 A1 | 6/2016 | You |

FOREIGN PATENT DOCUMENTS

| | | |
|---|---|---|
| CN | 104950423 A | 9/2015 |
| CN | 105717611 A | 6/2016 |
| JP | 2006-337690 A | 12/2006 |
| KR | 10-1499969 B1 | 3/2015 |
| TW | 201428336 A | 7/2014 |
| TW | I479190 B | 4/2015 |
| WO | WO 2012/008357 A1 | 1/2012 |

OTHER PUBLICATIONS

Chinese Office Action dated Sep. 5, 2017, in corresponding Chinese Patent Application No. 201510958586.7.
Chinese Office Action dated Oct. 22, 2018 in corresponding Chinese Patent Application No. 201510958586.7.

| SURFACE NO. | RADIUS OF CURVATURE | THICKNESS/ DISTANCE | REFRACTIVE INDEX | ABBE NUMBER | REMARK |
|---|---|---|---|---|---|
| S1 | 8.576 | 0.300 | 1.535 | 55.700 | FIRST LENS |
| S2 | 2.278 | 0.468 | | | |
| S3 | 3.299 | 0.227 | 1.651 | 21.500 | SECOND LENS |
| S4 | 2.858 | 0.030 | | | |
| S5 | 1.324 | 0.631 | 1.544 | 56.100 | THIRD LENS |
| S6 | -1.540 | 0.144 | | | |
| S7 | -5.782 | 0.220 | 1.641 | 22.400 | FOURTH LENS |
| S8 | 4.458 | 0.377 | | | |
| S9 | -1.255 | 0.583 | 1.544 | 56.100 | FIFTH LENS |
| S10 | -0.751 | 0.030 | | | |
| S11 | 1.948 | 0.541 | 1.564 | 21.300 | SIXTH LENS |
| S12 | 0.731 | 0.349 | | | |
| S13 | infinity | 0.118 | 1.516 | 51.300 | FILTER |
| S14 | infinity | 0.484 | | | |
| IMAGE PLANE | | | | | |

FIG. 4

| FIRST EMBODIMENT RADIUS OF CURVATURE | S1 | S2 | S3 | S4 | S5 | S6 | S7 | S8 | S9 | S10 | S11 | S12 |
|---|---|---|---|---|---|---|---|---|---|---|---|---|
| K | 8.5760 | 2.2777 | 3.2991 | 2.8577 | 1.3242 | -1.5395 | -5.7821 | 4.4584 | -1.2551 | -0.7507 | 1.9483 | 0.7305 |
| A | 0.0000 | 0.0000 | 0.0000 | 0.0000 | 0.0000 | 0.0000 | 0.0000 | 0.0000 | 0.6781 | -0.5208 | 0.0000 | -4.7437 |
| B | 0.0083 | 0.0172 | -0.0248 | -0.0006 | -0.1358 | 0.0610 | 0.3652 | 0.3761 | 0.3110 | 0.5583 | -0.3443 | -0.1238 |
| C | -0.0074 | -0.0225 | -0.0811 | 0.0134 | 0.4338 | -1.1526 | -2.1103 | -1.0862 | -0.9242 | -1.1838 | 0.1279 | 0.0591 |
| D | 0.0023 | 0.0020 | 0.1163 | 0.0887 | -6.3741 | 2.2956 | 5.2913 | 1.2945 | 2.1462 | 2.6484 | 0.0006 | -0.0202 |
| E | -0.0023 | -0.0135 | 0.0743 | 0.7818 | 35.2814 | -1.1809 | -6.1304 | 4.5132 | -5.7602 | -3.9600 | -0.0166 | 0.0039 |
| F | | | | | -115.4171 | -18.5874 | -8.8920 | -20.0047 | 9.8828 | 3.4339 | 0.0049 | -0.0003 |
| | | | | | 189.5504 | 58.0546 | 39.4447 | 32.3208 | -6.3365 | -1.1254 | -0.0006 | 0.0000 |
| G | | | | | -134.0000 | -60.1835 | -38.0641 | -19.2729 | | | | |

FIG. 5

| SURFACE NO. | RADIUS OF CURVATURE | THICKNESS/ DISTANCE | REFRACTIVE INDEX | ABBE NUMBER | REMARK |
|---|---|---|---|---|---|
| S1 | 8.121 | 0.300 | 1.535 | 55.700 | FIRST LENS |
| S2 | 2.153 | 0.462 | | | |
| S3 | 3.357 | 0.220 | 1.651 | 21.500 | SECOND LENS |
| S4 | 2.874 | 0.030 | | | |
| S5 | 1.333 | 0.636 | 1.544 | 56.100 | THIRD LENS |
| S6 | -1.514 | 0.151 | | | |
| S7 | -8.707 | 0.220 | 1.641 | 22.400 | FOURTH LENS |
| S8 | 3.677 | 0.388 | | | |
| S9 | -1.188 | 0.585 | 1.544 | 56.100 | FIFTH LENS |
| S10 | -0.732 | 0.030 | | | |
| S11 | 1.884 | 0.534 | 1.577 | 66.700 | SIXTH LENS |
| S12 | 0.735 | 0.344 | | | |
| S13 | infinity | 0.118 | 1.516 | 51.300 | FILTER |
| S14 | infinity | 0.482 | | | |
| IMAGE PLANE | | | | | |

FIG. 9

| SECOND EMBODIMENT | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE K | 8.1210 | 2.1528 | 3.3571 | 2.8738 | 1.3330 | -1.5139 | -8.7073 | 3.6772 | -1.1879 | -0.7318 | 1.8845 | 0.7346 |
| A | 0.0000 | 0.0000 | 0.0000 | 0.0000 | 0.0000 | 0.0000 | 0.0000 | 0.0000 | 0.5818 | -0.5313 | 0.0000 | -4.8423 |
| B | 0.0075 | 0.0173 | -0.0275 | 0.0000 | -0.1291 | 0.0760 | 0.3499 | 0.3511 | 0.3120 | 0.5654 | -0.3394 | -0.1200 |
| C | -0.0099 | -0.0254 | -0.0681 | 0.0378 | 0.4406 | -1.1665 | -2.1331 | -1.0924 | -0.9219 | -1.1965 | 0.1238 | 0.0550 |
| D | 0.0016 | -0.0042 | 0.1476 | 0.1595 | -6.3249 | 2.2317 | 5.1973 | 1.3077 | 2.1877 | 2.6615 | -0.0019 | -0.0186 |
| E | -0.0027 | -0.0215 | 0.0385 | 0.7351 | 35.1622 | -1.0970 | -6.1636 | 4.4498 | -5.6118 | -3.9441 | -0.0161 | 0.0038 |
| F | | | | | -115.4171 | -18.5874 | -8.8920 | -20.0047 | 9.8828 | 3.4339 | 0.0052 | -0.0004 |
| G | | | | | 189.5504 | 58.0546 | 39.4447 | 32.3208 | -6.3365 | -1.1254 | -0.0007 | 0.0000 |
| | | | | | -134.0000 | -60.1835 | -38.0641 | -19.2729 | | | | |

FIG. 10

| SURFACE NO. | RADIUS OF CURVATURE | THICKNESS/ DISTANCE | REFRACTIVE INDEX | ABBE NUMBER | REMARK |
|---|---|---|---|---|---|
| S1 | 2.257 | 0.300 | 1.535 | 55.700 | FIRST LENS |
| S2 | 1.050 | 0.635 | | | |
| S3 | 3.358 | 0.250 | 1.635 | 38.800 | SECOND LENS |
| S4 | 6.222 | 0.142 | | | |
| S5 | 2.072 | 0.454 | 1.544 | 56.100 | THIRD LENS |
| S6 | −1.201 | 0.142 | | | |
| S7 | −18.796 | 0.220 | 1.651 | 21.500 | FOURTH LENS |
| S8 | 2.763 | 0.341 | | | |
| S9 | −1.172 | 0.569 | 1.544 | 56.100 | FIFTH LENS |
| S10 | −0.673 | 0.030 | | | |
| S11 | 1.748 | 0.514 | 1.640 | 33.500 | SIXTH LENS |
| S12 | 0.759 | 0.302 | | | |
| S13 | infinity | 0.118 | 1.516 | 51.300 | FILTER |
| S14 | infinity | 0.482 | | | |
| IMAGE PLANE | | | | | |

FIG. 14

| THIRD EMBODIMENT | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 2.2574 | 1.0503 | 3.3584 | 6.2218 | 2.0720 | -1.2007 | -18.7960 | 2.7632 | -1.1723 | -0.6728 | 1.7476 | 0.7594 |
| K | 0.0000 | 0.0000 | 0.0000 | 0.0000 | 0.0000 | 0.0000 | 0.0000 | 0.0000 | 0.4406 | -0.5841 | 0.0000 | -5.5276 |
| A | 0.0186 | 0.0182 | -0.1638 | 0.0147 | 0.0768 | 0.1197 | 0.2071 | 0.2834 | 0.4045 | 0.6303 | -0.3364 | -0.1221 |
| B | -0.0143 | -0.0398 | -0.1767 | 0.0736 | 0.2971 | -1.2997 | -2.0876 | -1.0792 | -0.8672 | -1.1947 | 0.1227 | 0.0544 |
| C | 0.0041 | -0.0274 | 0.1978 | -0.2794 | -5.7884 | 3.3756 | 5.0845 | 1.3995 | 2.4189 | 2.6868 | -0.0101 | -0.0188 |
| D | 0.0005 | -0.0321 | -0.1063 | 2.1272 | 32.1902 | -4.7892 | -7.0551 | 4.1883 | -5.6517 | -3.8641 | -0.0155 | 0.0043 |
| E | | | | | -115.4171 | -18.5874 | -8.8920 | -20.0047 | 9.8828 | 3.4339 | 0.0066 | -0.0006 |
| F | | | | | 189.5504 | 58.0546 | 39.4447 | 32.3208 | -6.3365 | -1.1254 | -0.0010 | 0.0000 |
| G | | | | | -134.0000 | -60.1835 | -38.0641 | -19.2729 | | | | |

FIG. 15

| SURFACE NO. | RADIUS OF CURVATURE | THICKNESS/ DISTANCE | REFRACTIVE INDEX | ABBE NUMBER | REMARK |
|---|---|---|---|---|---|
| S1 | 4.226 | 0.250 | 1.535 | 55.700 | FIRST LENS |
| S2 | 1.843 | 0.606 | | | |
| S3 | 3.203 | 0.220 | 1.651 | 21.500 | SECOND LENS |
| S4 | 2.818 | 0.044 | | | |
| S5 | 1.312 | 0.643 | 1.544 | 56.100 | THIRD LENS |
| S6 | −1.595 | 0.139 | | | |
| S7 | −7.574 | 0.220 | 1.651 | 15.200 | FOURTH LENS |
| S8 | 3.759 | 0.367 | | | |
| S9 | −1.330 | 0.579 | 1.544 | 56.100 | FIFTH LENS |
| S10 | −0.767 | 0.030 | | | |
| S11 | 1.920 | 0.547 | 1.574 | 37.500 | SIXTH LENS |
| S12 | 0.744 | 0.355 | | | |
| S13 | infinity | 0.110 | 1.516 | 51.300 | FILTER |
| S14 | infinity | 0.390 | | | |
| IMAGE PLANE | | | | | |

FIG. 19

| FOURTH EMBODIMENT | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 4.2264 | 1.8428 | 3.2031 | 2.8184 | 1.3117 | -1.5949 | -7.5736 | 3.7589 | -1.3302 | -0.7672 | 1.9196 | 0.7440 |
| K | 0.0000 | 0.0000 | 0.0000 | 0.0000 | 0.0000 | 0.0000 | 0.0000 | 0.0000 | 0.7721 | -0.5295 | 0.0000 | -4.8341 |
| A | 0.0082 | 0.0190 | -0.0233 | -0.0025 | -0.1231 | 0.0650 | 0.3545 | 0.3689 | 0.2923 | 0.5534 | -0.3284 | -0.1180 |
| B | -0.0079 | -0.0192 | -0.0687 | 0.0215 | 0.4502 | -1.1604 | -2.1148 | -1.0902 | -0.9525 | -1.1963 | 0.1240 | 0.0574 |
| C | 0.0024 | 0.0020 | 0.1381 | 0.1361 | -6.3738 | 2.2710 | 5.2842 | 1.2950 | 2.1191 | 2.6402 | -0.0001 | -0.0202 |
| D | -0.0025 | -0.0131 | 0.0818 | 0.7539 | 35.4866 | -1.0018 | -6.2361 | 4.5099 | -5.7953 | -3.9580 | -0.0163 | 0.0040 |
| E |  |  |  |  | -115.4171 | -18.5874 | -8.8920 | -20.0047 | 9.8828 | 3.4339 | 0.0051 | -0.0003 |
| F |  |  |  |  | 189.5504 | 58.0546 | 39.4447 | 32.3208 | -6.3365 | -1.1254 | -0.0006 | 0.0000 |
| G |  |  |  |  | -134.0000 | -60.1835 | -38.0641 | -19.2729 |  |  |  |  |

FIG. 20

| SURFACE NO. | RADIUS OF CURVATURE | THICKNESS/ DISTANCE | REFRACTIVE INDEX | ABBE NUMBER | REMARK |
|---|---|---|---|---|---|
| S1 | 18.6967 | 0.3000 | 1.535 | 55.700 | FIRST LENS |
| S2 | 1.1026 | 0.4660 | | | |
| S3 | 1.8797 | 0.3521 | 1.585 | 32.800 | SECOND LENS |
| S4 | 5.3737 | 0.2484 | | | |
| S5 | 1.2717 | 0.8154 | 1.544 | 56.100 | THIRD LENS |
| S6 | -1.5532 | 0.0300 | | | |
| S7 | -24.7895 | 0.2200 | 1.651 | 21.500 | FOURTH LENS |
| S8 | 2.1223 | 0.3290 | | | |
| S9 | -2.9234 | 0.5952 | 1.544 | 56.100 | FIFTH LENS |
| S10 | -0.7531 | 0.0300 | | | |
| S11 | 3.0552 | 0.4130 | 1.534 | 55.660 | SIXTH LENS |
| S12 | 0.7046 | 0.3009 | | | |
| S13 | infinity | 0.2100 | 1.517 | 64.200 | FILTER |
| S14 | infinity | 0.4900 | | | |
| image plane | | | | | |

FIG. 24

| FIFTH EMBODIMENT | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 18.6967 | 1.1026 | 1.8797 | 5.3737 | 1.2717 | -1.5532 | -24.7895 | 2.1223 | -2.9234 | -0.7531 | 3.0552 | 0.7046 |
| K | 0.0000 | -0.0394 | 0.0000 | 0.0000 | 0.0262 | -0.7491 | -8.0220 | -3.1798 | 0.7387 | -0.6663 | -0.1146 | -5.1036 |
| A | -0.0111 | -0.0171 | -0.0282 | -0.0380 | -0.0733 | 0.0120 | -0.3477 | -0.1524 | 0.0827 | 0.8599 | -0.2803 | -0.1703 |
| B | 0.0053 | -0.0217 | -0.0949 | -0.1247 | 1.0913 | -0.9960 | -0.7966 | -0.1020 | -0.0729 | -2.2194 | -0.0809 | 0.1138 |
| C | 0.0021 | -0.0659 | -0.0781 | 0.0211 | -12.5610 | 4.8361 | 4.6072 | 1.6409 | -0.7138 | 4.9566 | 0.3150 | -0.0625 |
| D | -0.0015 | 0.1179 | 0.0328 | -0.0187 | 76.0604 | -18.2816 | -18.7943 | -5.0682 | 1.8123 | -7.6727 | -0.2246 | 0.0254 |
| E | 0.0003 | -0.0589 | -0.0024 | 0.0383 | -260.2056 | 40.1697 | 42.8150 | 8.7615 | -1.4787 | 7.6192 | 0.0777 | -0.0072 |
| F | | | | | 465.4379 | -51.1713 | -57.3752 | -7.9651 | 0.2745 | -4.0604 | -0.0137 | 0.0012 |
| G | | | | | -343.9605 | 27.9413 | 34.7844 | 3.1532 | 0.0000 | 0.8682 | 0.0010 | -0.0001 |

FIG. 25

| SURFACE NO. | RADIUS OF CURVATURE | THICKNESS/ DISTANCE | REFRACTIVE INDEX | ABBE NUMBER | REMARK |
|---|---|---|---|---|---|
| S1 | 100.000 | 0.3000 | 1.535 | 55.700 | FIRST LENS |
| S2 | 1.7221 | 0.4394 | | | |
| S3 | 5.9804 | 0.2552 | 1.651 | 21.500 | SECOND LENS |
| S4 | 37.1318 | 0.3243 | | | |
| S5 | 1.3239 | 0.7572 | 1.544 | 56.100 | THIRD LENS |
| S6 | -1.8898 | 0.1221 | | | |
| S7 | -8.3371 | 0.2200 | 1.651 | 21.500 | FOURTH LENS |
| S8 | 3.1926 | 0.2113 | | | |
| S9 | -3.4277 | 0.8178 | 1.544 | 56.100 | FIFTH LENS |
| S10 | -0.6849 | 0.0586 | | | |
| S11 | 15.6604 | 0.4482 | 1.534 | 55.660 | SIXTH LENS |
| S12 | 0.7055 | 0.3197 | | | |
| S13 | infinity | 0.2644 | 1.568 | 64.200 | FILTER |
| S14 | infinity | 0.4618 | | | |
| image plane | | | | | |

FIG. 29

| SIXTH EMBODIMENT | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 100.0000 | 1.7221 | 5.9804 | 37.1318 | 1.3239 | -1.8898 | -8.3371 | 3.1926 | -3.4277 | -0.6849 | 15.6604 | 0.7055 |
| K | | | 0.0000 | 0.0000 | 0.2091 | 0.0353 | 0.0000 | -1.6756 | 4.1775 | -0.7749 | 43.3079 | -5.3564 |
| A | | | -0.0309 | 0.0008 | -0.0066 | -0.0870 | -0.3278 | -0.0817 | 0.0155 | 0.7954 | -0.2685 | -0.1739 |
| B | | | 0.0021 | 0.0236 | -0.1686 | -0.2298 | -0.2842 | 0.0002 | 0.5307 | -1.9255 | 0.0433 | 0.1365 |
| C | | | 0.0132 | -0.0135 | 0.5422 | 0.1094 | -0.1772 | -0.0048 | -3.6829 | 4.0898 | 0.0832 | -0.0878 |
| D | | | -0.0084 | 0.0208 | -1.5519 | -0.5540 | 0.1905 | 0.1564 | 13.1018 | -5.9442 | -0.0056 | 0.0400 |
| E | | | | | -0.0167 | 0.0199 | -0.0133 | 0.0156 | -25.4418 | 5.5919 | -0.0316 | -0.0119 |
| F | | | | | -0.0105 | 0.0125 | -0.0125 | 0.0050 | 26.0016 | -2.8254 | 0.0138 | 0.0020 |
| G | | | | | -0.0066 | 0.0079 | -0.0079 | 0.0032 | -11.1843 | 0.5653 | -0.0018 | -0.0001 |

FIG. 30

LENS MODULE

CROSS-REFERENCE TO RELATED APPLICATIONS

This application is a continuation of U.S. patent application Ser. No. 16/185,071 filed on Nov. 9, 2018, now U.S. Pat. No. 10,481,369 issued on Nov. 19, 2019, which is a continuation of U.S. patent application Ser. No. 14/974,997 filed on Dec. 18, 2015, now U.S. Pat. No. 10,215,959 issued on Feb. 26, 2019, which claims the benefit under 35 USC § 119(a) of Korean Patent Application No. 10-2014-0184401 filed on Dec. 19, 2014, in the Korean Intellectual Property Office, the entire disclosures of which are incorporated herein by reference for all purposes.

BACKGROUND

1. Field

The following description relates to a lens module having an optical system including six lenses.

2. Description of Related Art

A lens module mounted in a camera of a mobile communications terminal includes a plurality of lenses. For example, a lens module includes six lenses in order to configure an optical system having high resolution.

However, when the optical system having high resolution is configured an increased number of the plurality of lenses as described above, a length, which is a distance from an object-side surface of a first lens to an image plane of the optical system increases. In this case, it would be difficult to mount the lens module in a slim mobile communications terminal. Therefore, the development of a lens module having an optical system of decreased length is in demand.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a lens module, including: a first lens; a second lens; a third lens including a convex object-side surface and a convex image-side surface; a fourth lens including a concave object-side surface and a concave image-side surface; a fifth lens including a concave object-side surface; and a sixth lens including an inflection point formed on an image-side surface thereof, wherein the first to sixth lenses are sequentially disposed from an object side to an image side.

The first lens may include a meniscus shape with a convex object-side surface.

The second lens may include a meniscus shape with a convex object-side surface.

The fifth lens may include a convex image-side surface.
The sixth lens may include a convex object-side surface.
The sixth lens may include a concave image-side surface.
The lens module may also include a stop positioned between the second and third lenses.

$80<FOV\leq120$ may be satisfied, where FOV is a field of view of an optical system including the first to sixth lenses.

$15<V2$ may be satisfied, where V2 is an Abbe number of the second lens.

The first lens may include a negative refractive power, the second lens may include a positive refractive power or a negative refractive power, the third lens may include a positive refractive power, the fourth lens may include a negative refractive power, the fifth lens may include a positive refractive power, and the sixth lens may include a negative refractive power.

The third lens may have a refractive power stronger than a refractive power of the fifth lens.

The third lens may have a refractive power stronger than a refractive power of the second lens and fifth lens.

The image-side surface of the sixth lens may be concave in a paraxial region and gradually curves to be convex at an edge portion thereof.

In accordance with an embodiment, there is provided a lens module, including: a first lens including a negative refractive power; a second lens including a negative refractive power; a third lens including a positive refractive power; a fourth lens including a negative refractive power; a fifth lens including a refractive power; and a sixth lens including a negative refractive power, wherein the first to sixth lenses are sequentially disposed from an object side to an image side.

The fifth lens may include a positive refractive power.
The fourth lens may include a concave object-side surface.
The third lens may be a convex object-side surface and a convex image-side surface.
The fourth lens may include a concave image-side surface.

$d4/d3<0.7$ may be satisfied, where d3 is a thickness of the second lens, and d4 is a distance from an image-side surface of the second lens to an object-side surface of the third lens.

$1.0<(r3+r4)/(r3-r4)$ may be satisfied, where r3 is a radius of curvature of an object-side surface of the second lens, and r4 is a radius of curvature of an image-side surface of the second lens.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 4 illustrates a table representing characteristics of lenses illustrated in FIG. 1;

FIG. 5 illustrates a table representing conic constants and aspheric coefficients of the lens module illustrated in FIG. 1;

FIG. 9 illustrates a table representing characteristics of lenses illustrated in FIG. 6;

FIG. 10 illustrates a table representing conic constants and aspheric coefficients of the lens module illustrated in FIG. 6;

FIG. 14 illustrates a table representing characteristics of lenses illustrated in FIG. 11;

FIG. 15 illustrates a table representing conic constants and aspheric coefficients of the lens module illustrated in FIG. 11;

FIG. 19 is a table representing characteristics of lenses illustrated in FIG. 16; and FIG. 20 illustrates a table representing conic constants and aspheric coefficients of the lens module illustrated in FIG. 16.

FIG. 24 is a table representing characteristics of lenses illustrated in FIG. 21; and FIG. 25 illustrates a table representing conic constants and aspheric coefficients of the lens module illustrated in FIG. 21.

FIG. 29 is a table representing characteristics of lenses illustrated in FIG. 26; and FIG. 30 illustrates a table representing conic constants and aspheric coefficients of the lens module illustrated in FIG. 26. Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
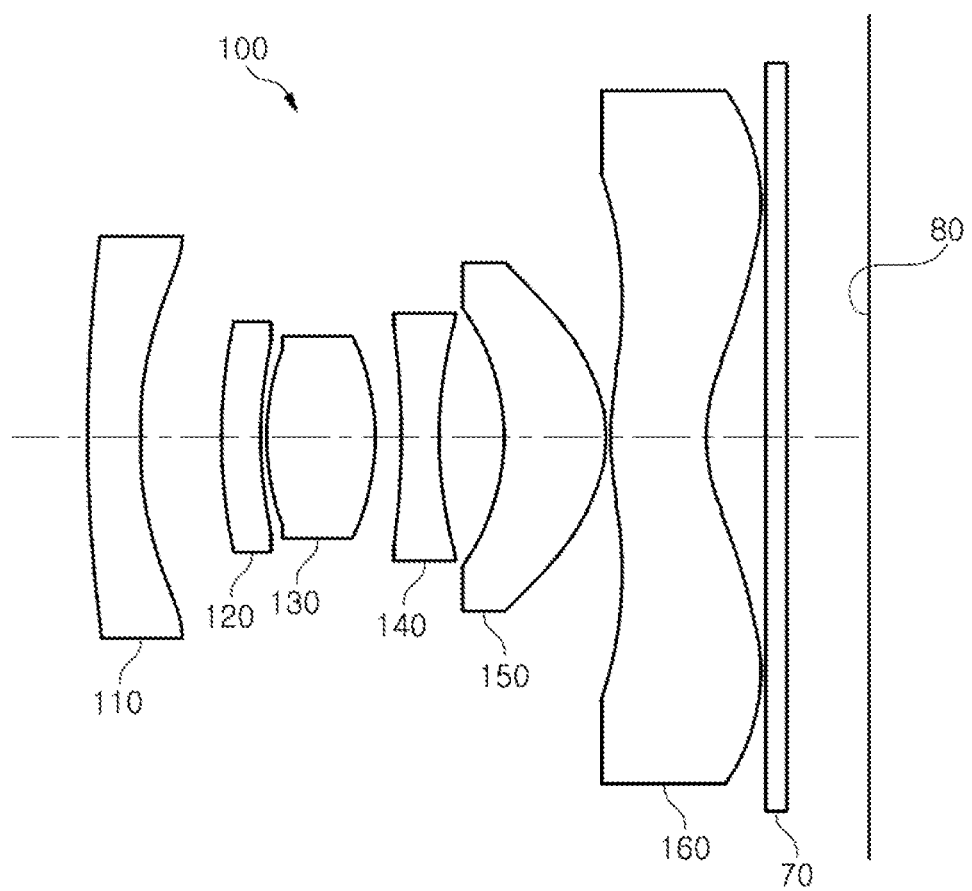
FIG. 1 is a view of a lens module, according to a first embodiment.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In the following lens configuration diagrams, thicknesses, sizes, and shapes of lenses may be exaggerated for clarity. Particularly, the shapes of spherical surfaces and aspherical surfaces, as illustrated in the lens configuration diagrams, are only illustrated by way of example, but are not limited to those illustrated in the drawings.

In some configurations, lenses included in lens modules are formed of plastic or polycarbonate, a material lighter than glass. In other configurations, some of the lenses included in the modules are formed of plastic or polycarbonate, and other lenses may be formed of glass. According to some configurations, a lens module may include four or more lenses in order to achieve high levels of resolution in images being captured.

In addition, in accordance with an embodiment, a first lens refers to a lens closest to an object (or a subject), while a sixth lens refers to a lens closest to an image plane (or an image sensor). Further, an object-side surface of each lens refers to a surface thereof closest to an object (or a subject), and an image-side surface of each lens refers to a surface thereof closest to an image plane (or an image sensor). Further, in the present specification, all of radii of curvature, thicknesses, OALs (optical axis distances from an object-side surface of the first lens to the image plane), (a distance on the optical axis between a stop and an image sensor) SLs, IMGHs (image heights), and BFLs (back focus lengths) of the lenses, an overall focal length of an optical system, and a focal length of each lens are indicated by millimeters (mm).

Additionally, thicknesses of lenses, gaps between the lenses, OALs, and SLs are distances measured based on an optical axis of the lenses. Further, in a description for shapes of the lenses, a surface of a lens being convex is one in which an optical axis portion of a corresponding surface is convex, and a surface of a lens being concave is one in which an optical axis portion of a corresponding surface is concave.

Therefore, although it is described that one surface of a lens is convex, an edge portion of the lens may be concave. Likewise, although it is described that one surface of a lens is concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

A lens module includes an optical system with a plurality of lenses. For example, the optical system of the lens module includes six lenses having refractive power. However, the lens module is not limited to only including the six lenses. For example, the lens module may include other components that do not have refractive power, such as a stop controlling an amount of light. As another example, the lens module includes an infrared cut-off filter filtering infrared light. As another example, the lens module may further include an image sensor, for example, an imaging device, to convert an image of a subject incident thereon passing through the optical system into electrical signals. As another example, the lens module may further include a gap maintaining member adjusting a gap between lenses. In one illustrative embodiment, the gap maintaining member adjusts each lens to be at a distance from each other and the filter. However, in an alternative embodiment, the gap maintaining member may adjust each lens so that at least two of the lenses are in contact with each other, while the other lenses and the filter have a predetermined gap there between. In a further embodiment, the gap maintaining member may adjust each lens so that at least two of the lenses are in contact with each other, while the other lenses have a gap there between and at least one of the lenses is in contact with the filter.

First to sixth lenses are formed of materials having a refractive index different from that of air. For example, the first to sixth lenses are formed of plastic or glass. At least one of the first to sixth lenses has an aspherical surface shape. As an example, the sixth lens of the first to sixth lenses has the aspherical surface shape. As another example, at least one surface of all of the first to sixth lenses is aspherical. In one example, the aspherical surface of each lens may be represented by the following Equation 1:

$$Z = \frac{cr^2}{1 + \sqrt{1 - (1+k)c^2r^2}} + Ar^4 + Br^6 +$$
$$Cr^8 + Dr^{10} + Er^{12} + Fr^{14} + Gr^{16} + Hr^{18} + Jr^{20}.$$

[Equation 1]

In an example, c is an inverse of a radius of curvature of a corresponding lens, K is a conic constant, and r is a distance from a certain point on an aspherical surface to an optical axis in a direction perpendicular to the optical axis. In addition, constants A to J sequentially refer to 4th order to 20th order aspheric coefficients. In addition, Z is a distance between the certain point on the aspherical surface at the distance r and a tangential plane meeting the apex of the aspherical surface of the lens.

The optical system configuring the lens module may have a wide field of view (FOV) of 80 degrees or more. Therefore, the lens module, according to the embodiment, is configured to easily photograph a wide background or object.

The lens module includes the first to sixth lenses. In addition, the lens module further includes a filter and an image sensor. Next, the above-mentioned components will be described. In accordance with an illustrative example, the embodiments described of the optical system include six lenses with a particular refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result. Each of the first through sixth lenses has a refractive power, either negative or positive. For instance, in one configuration, the first lens has a refractive power. For example, the first lens has a negative refractive power.

The first lens has a meniscus shape. For example, the first lens has a meniscus shape of which a first surface (object-side surface) is convex and a second surface (image-side surface) is concave.

The first lens may have an aspherical surface. For example, both surfaces of the first lens are aspherical. The first lens is formed of a material having high light transmissivity and excellent workability. For example, the first lens may be formed of plastic or an organic polymer. However, a material of the first lens is not limited to plastic. For example, the first lens may be formed of glass.

The second lens has a refractive power. For example, the second lens has a positive refractive power. Alternatively, the second lens has a negative refractive power.

The second lens has a meniscus shape. For example, the second lens has a meniscus shape of which the object-side surface is convex and the image-side surface is concave.

The second lens has an aspherical surface. For example, an image-side surface of the second lens is aspherical. The second lens is formed of a material having high light transmissivity and excellent workability. For example, the second lens is formed of plastic or other organic polymer. However, a material of the second lens is not limited to plastic. For example, the second lens is formed of glass.

The second lens is formed of a material having a low refractive index. For example, the second lens is formed of a material having an Abbe number of 20 or more. The second lens formed of this material effectively corrects chromatic aberration caused by the first lens.

The third lens has a refractive power. For example, the third lens has a positive refractive power.

One surface of the third lens is convex. As an example, the object-side surface of the third lens is convex. As another example, the image-side surface of the third lens is convex. As another example, both surfaces of the third lens are convex.

The third lens has an aspherical surface. For example, both surfaces of the third lens are aspherical. The third lens is formed of a material having high light transmissivity and excellent workability. For example, the third lens is formed of plastic or glass.

The fourth lens has a refractive power. For example, the fourth lens may have negative refractive power.

One surface of the fourth lens is concave. For example, the object-side surface of the fourth lens is concave. As another example, the image-side surface of the fourth lens is concave. As another example, both surfaces of the fourth lens may be concave.

The fourth lens has an aspherical surface. For example, both surfaces of the fourth lens are aspherical. The fourth lens is formed of a material having high light transmissivity and excellent workability. For example, the fourth lens is formed of plastic or glass.

The fifth lens has a refractive power. For example, the fifth lens may have positive refractive power.

The fifth lens has a meniscus shape. For example, the fifth lens has a meniscus shape of which the object-side surface is concave and the image-side surface is convex.

The fifth lens has an aspherical surface. For example, both surfaces of the fifth lens are aspherical. The fifth lens is formed of a material having high light transmissivity and excellent workability. For example, the fifth lens may be formed of plastic or glass.

The sixth lens has a refractive power. For example, the sixth lens has a negative refractive power.

One or more inflection points are formed on at least one of an object-side surface and an image-side surface of the sixth lens. As an example, the object-side surface of the sixth lens is convex at the center of an optical axis, but may be concave in the vicinity of the optical axis. As another example, the image-side surface of the sixth lens is concave at the center of the optical axis, but may be convex in the vicinity of the optical axis. For instance, the image-side surface of the sixth lens is concave in a paraxial region and gradually curves to be convex at an edge portion thereof.

The sixth lens has an aspherical surface. For example, both surfaces of the sixth lens are aspherical. The sixth lens is formed of a material having high light transmissivity and high workability. For example, the sixth lens may be formed of plastic or glass.

A person of ordinary skill in the relevant art will appreciate that each of the first through sixth lenses may be configured in an opposite refractive power from the configuration described above. For example, in an alternative configuration, the first lens has a positive refractive power, the second lens has a negative refractive power, the third lens has a negative refractive power, the fourth lens has a positive refractive power, the fifth lens has a negative refractive power, and the sixth lens has a positive refractive power.

The filter filters a partial wavelength from incident light incident through the first to sixth lenses. For example, the filter is an infrared cut-off filter filtering an infrared wavelength of the incident light. The filter is formed of plastic or glass and has an Abbe number of 60 or more.

The image sensor realizes a high resolution of 1300 megapixels. For example, a unit size of the pixels configuring the image sensor may be 1.12 μm or less.

The lens module configured as described above has a wide field of view. For example, the lens module has a field of view of 80 degrees or more. In addition, the lens module has a relatively short length. For example, an overall length TTL, which is a distance from the object-side surface of the first lens to the image plane of the lens module is 4.60 mm or less. Therefore, the lens module, according to an embodiment, is advantageously miniaturized.

The lens module satisfies the following Conditional Expression 1:

$$80<FOV\leq120.$$ [Conditional Expression 1]

In one example, FOV is a field of view of the optical system including the first to sixth lenses.

The lens module satisfies at least one of the following Conditional Expressions 2 and 3:

$$15<V2$$ [Conditional Expression 2]

$$V2<50.$$ [Conditional Expression 3]

In one example, V2 is an Abbe number of the second lens.

The lens module satisfies at least one of the following Conditional Expressions 4 and 5:

$$d4/d3<0.7$$ [Conditional Expression 4]

$$d4/d3<0.4.$$ [Conditional Expression 5]

In one example, d3 is a thickness of the second lens, and d4 is a distance from the image-side surface of the second lens to an object-side surface of the third lens.

The lens module satisfies at least one of the following Conditional Expressions 6 and 7:

$$1.0<(r3+r4)/(r3-r4)$$ [Conditional Expression 6]

$$1.0<(r3+r4)/(r3-r4)<2.5.$$ [Conditional Expression 7]

In an example, r3 is a radius of curvature of an object-side surface of the second lens, and r4 is a radius of curvature of the image-side surface of the second lens.

The above Conditional Expressions 1 through 7 are conditions to optimize manufacturing of the second lens. For example, in a case in which a numerical range depending on the above Conditional Expressions 1 through 7 are satisfied, the second lens is easily manufactured.

A lens module, according to a first embodiment, will be described with reference to FIG. 1.

A lens module 100 includes an optical system including a first lens 110, a second lens 120, a third lens 130, a fourth lens 140, a fifth lens 150, and a sixth lens 160. In addition, the lens module 100 also includes an infrared cut-off filter 70 and an image sensor 80. Further, the lens module 100 further includes a stop (ST). For example, the stop is disposed between the second and third lenses.

In an embodiment, the first lens 110 has a negative refractive power, and an object-side surface thereof is convex and an image-side surface thereof is concave. The second lens 120 has a negative refractive power, and an object-side surface thereof is convex and an image-side surface thereof is concave. The third lens 130 has a positive refractive power, and an object-side surface thereof is convex and an image-side surface thereof is convex. The fourth lens 140 has a negative refractive power, and an object-side surface thereof is concave and an image-side surface thereof is concave. The fifth lens 150 has a positive refractive power, and an object-side surface thereof is concave and an image-side surface thereof is convex. The sixth lens 160 has a negative refractive power, and an object-side surface thereof is convex and an image-side surface thereof is concave. In addition, the sixth lens 160 has an aspherical surface shape in which inflection points are formed on an object-side surface and an image-side surface thereof, respectively.

In an embodiment, the third and fifth lenses 130 and 150 have positive refractive power. In one example, a focal length (f3) of the third lens 130 and a focal length (f5) of the fifth lens 150 have the following relationship therebetween. For example, the third lens 130 has a refractive power stronger than a refractive power of the fifth lens 150.

$$f3<f5$$ [Relational Expression 1]

In an embodiment, the first lens 110, the second lens 120, the fourth lens 140, and the sixth lens 160 have negative refractive power. In an example, a focal length (f1) of the first lens 110, a focal length (f2) of the second lens 120, a focal length (f4) of the fourth lens 140, and a focal length (f6) of the sixth lens 160 have the following relationship thereamong:

$$f2<f1<f4<f6.$$ [Relational Expression 2]

Figure 2:
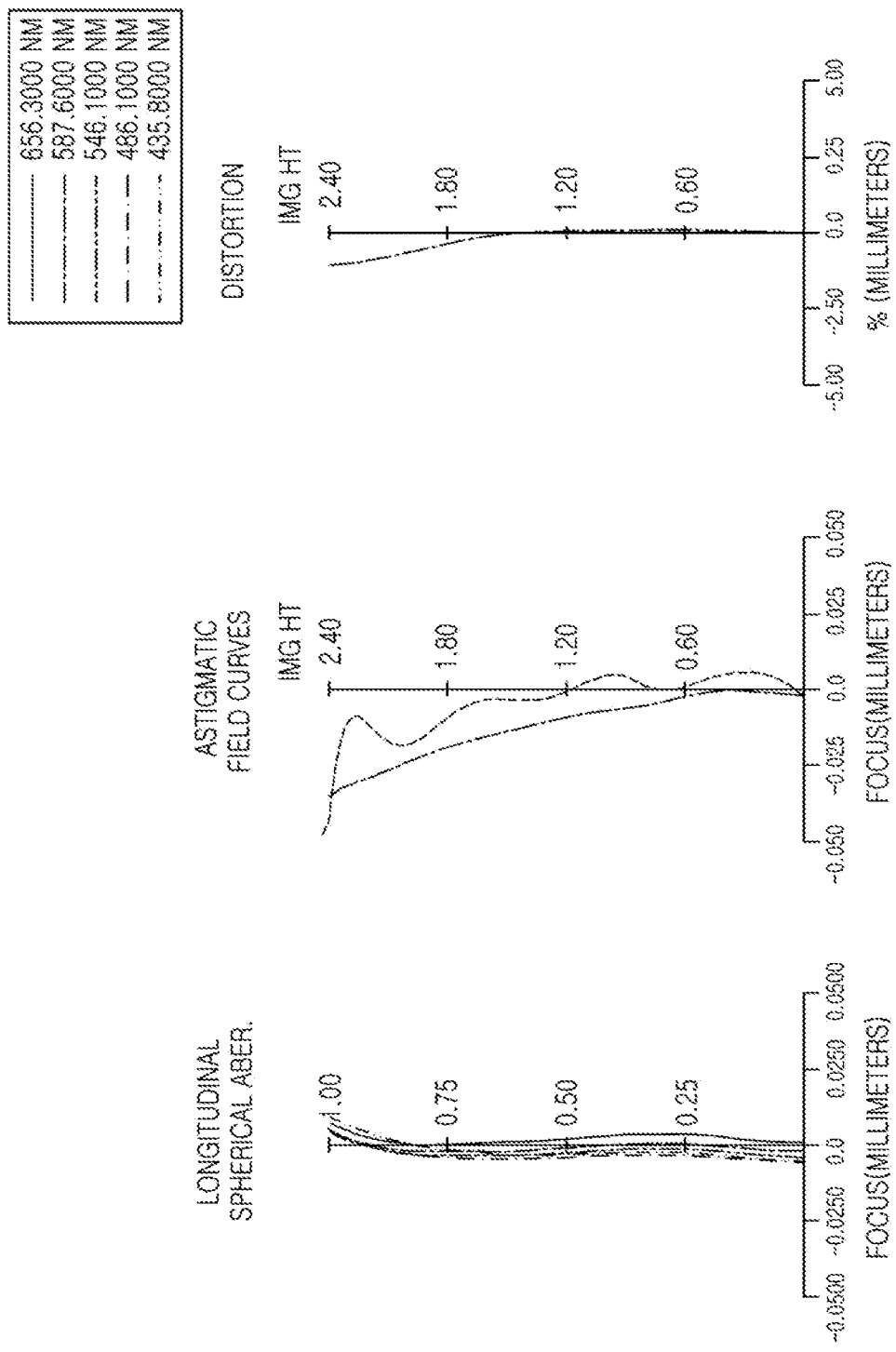
FIG. 2 illustrates graphs having curves representing aberration characteristics of the lens module illustrated in FIG. 1.
Figure 3:
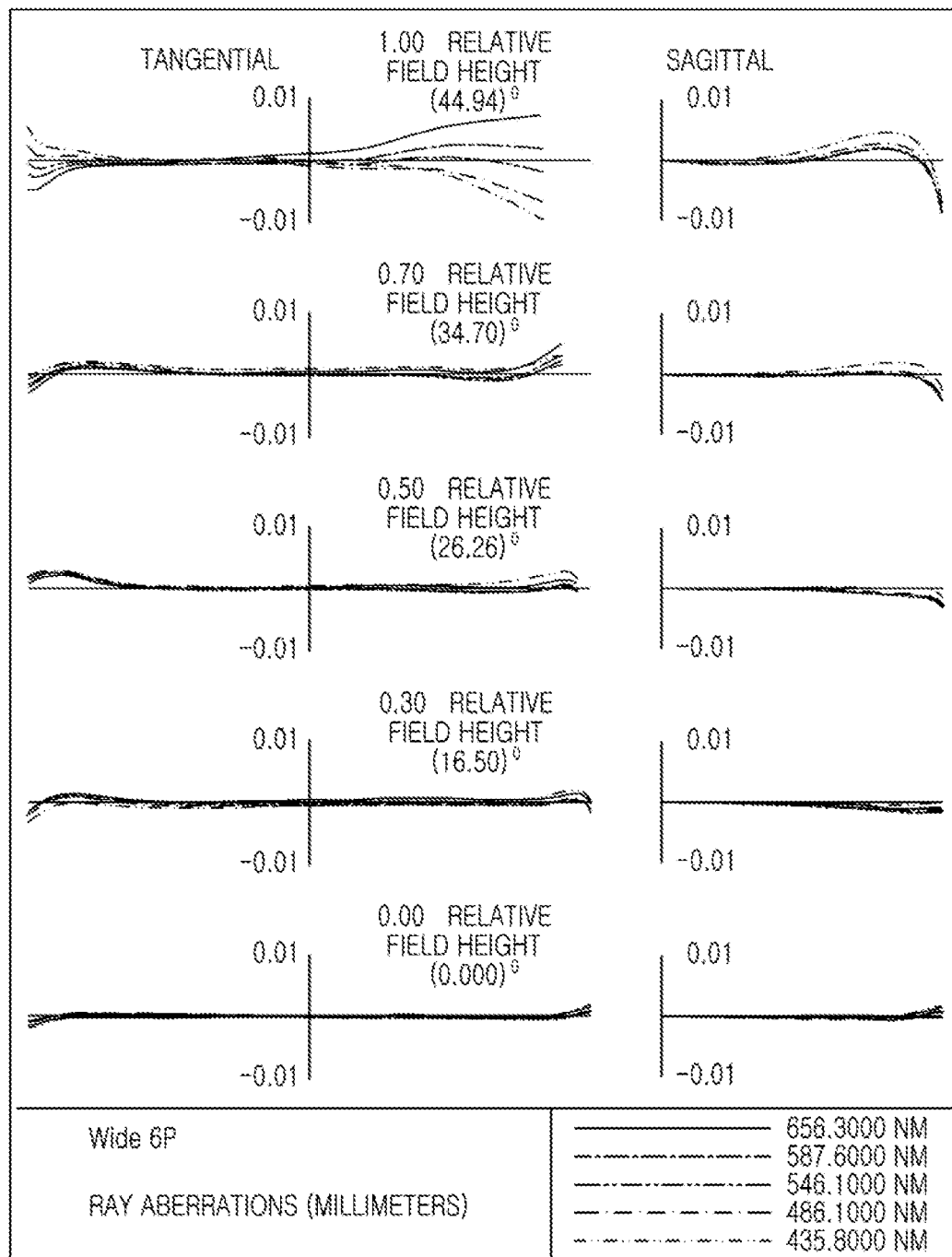
FIG. 3 illustrates graphs having curves representing modulation transfer function (MTF) characteristics of the lens module illustrated in FIG. 1.

FIGS. 2 and 3 are graphs having curves representing aberration characteristics and modulation transfer function (MTF) characteristics of the lens module, in accordance with an embodiment.

FIG. 4 is a table representing characteristics of the lenses configuring the lens module. In FIG. 4, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 to S12 represent first and second surfaces of the third to sixth lenses, respectively. In addition, Surface Nos. S13 and S14 represent first and second surfaces of the infrared cut-off filter.

FIG. 5 is a table representing conic constants and aspheric coefficients of the lenses configuring the lens module, in accordance with an embodiment. In FIG. 5, S1 to S12 are Surface Nos. of corresponding surfaces of the first through sixth lenses, and K and A to G are conic constants (K) and aspheric coefficients (A to G) of corresponding surfaces of the first through sixth lenses.

Figure 6:
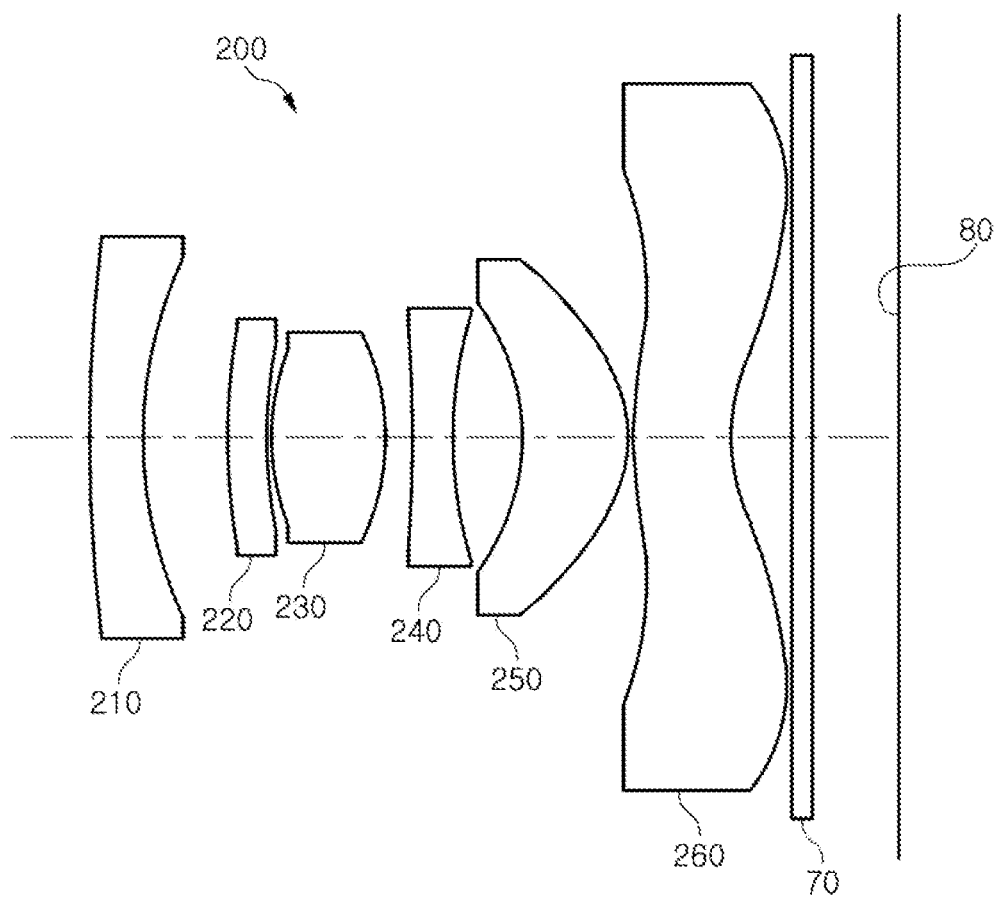
FIG. 6 illustrates a view of a lens module, according to a second embodiment.

A lens module, according to a second embodiment, will be described with reference to FIG. 6.

A lens module 200 includes an optical system including a first lens 210, a second lens 220, a third lens 230, a fourth lens 240, a fifth lens 250, and a sixth lens 260. In addition, the lens module 200 further includes an infrared cut-off filter 70 and an image sensor 80. Further, the lens module 200 further includes a stop (ST). For example, the stop is disposed between the second and third lenses.

In an embodiment, the first lens 210 has a negative refractive power, and an object-side surface thereof is convex and an image-side surface thereof is concave. The second lens 220 has negative refractive power, and an object-side surface thereof is convex and an image-side surface thereof is concave. The third lens 230 has a positive refractive power, and an object-side surface thereof is convex and an image-side surface thereof is convex. The fourth lens 240 has a negative refractive power, and an object-side surface thereof is concave and an image-side surface thereof is concave. The fifth lens 250 has a positive refractive power, and an object-side surface thereof is concave and an image-side surface thereof is convex. The sixth lens 260 has a negative refractive power, and an object-side surface thereof is convex and an image-side surface thereof is concave. In addition, the sixth lens 260 has an aspherical surface shape in which inflection points are formed on an object-side surface and an image-side surface thereof, respectively.

In an embodiment, the third and fifth lenses 230 and 250 may have positive refractive power. In one example, a focal length (f3) of the third lens 230 and a focal length (f5) of the fifth lens 250 have the following relationship therebetween. For example, the third lens 230 has a refractive power stronger than a refractive power of the fifth lens 250.

$$f3 < f5 \qquad \text{[Relational Expression 3]}$$

In an embodiment, the first lens 210, the second lens 220, the fourth lens 240, and the sixth lens 260 have negative refractive power. In an example, a focal length (f1) of the first lens 210, a focal length (f2) of the second lens 220, a focal length (f4) of the fourth lens 240, and a focal length (f6) of the sixth lens 260 have the following relationship thereamong:

$$f2 < f1 < f4 < f6. \qquad \text{[Relational Expression 4]}$$

Figure 7:
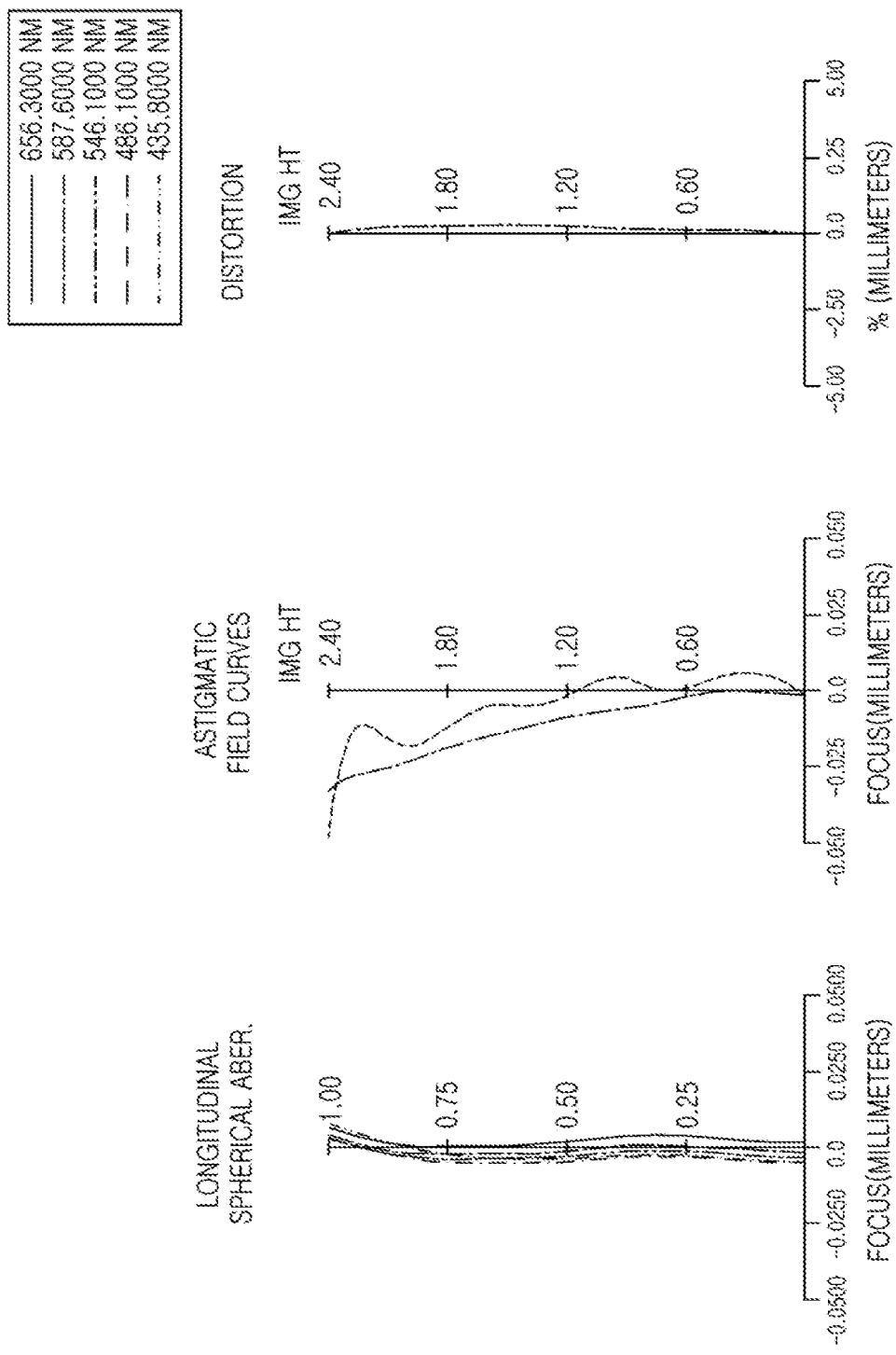
FIG. 7 illustrates graphs having curves representing aberration characteristics of the lens module illustrated in FIG. 6.
Figure 8:
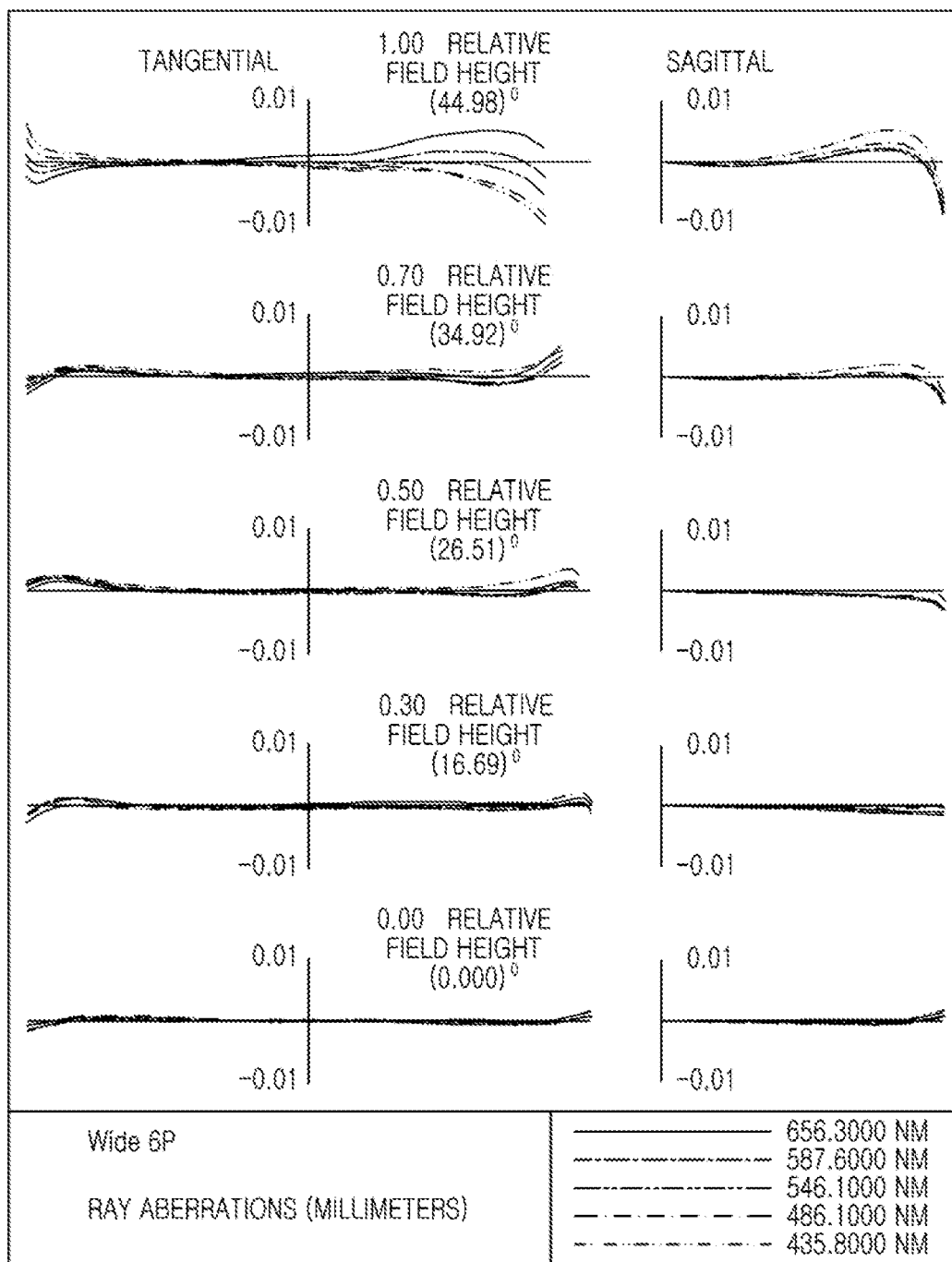
FIG. 8 illustrates graphs having curves representing MTF characteristics of the lens module illustrated in FIG. 6.

FIGS. 7 and 8 are graphs having curves representing aberration characteristics and MTF characteristics of the lens module, in accordance with an embodiment.

FIG. 9 is a table representing characteristics of the lenses configuring the lens module. In FIG. 9, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 through S12 represent first and second surfaces of the third to sixth lenses, respectively. In addition, Surface Nos. S13 and S14 represent first and second surfaces of the infrared cut-off filter.

FIG. 10 is a table representing conic constants and aspheric coefficients of the lenses configuring the lens module, in accordance with an embodiment. In FIG. 10, S1 to S12 represent Surface Nos. of corresponding surfaces of the first through sixth lenses, and K and A to G represent conic constants (K) and aspheric coefficients (A to G) of corresponding surfaces of the first through sixth lenses.

Figure 11:
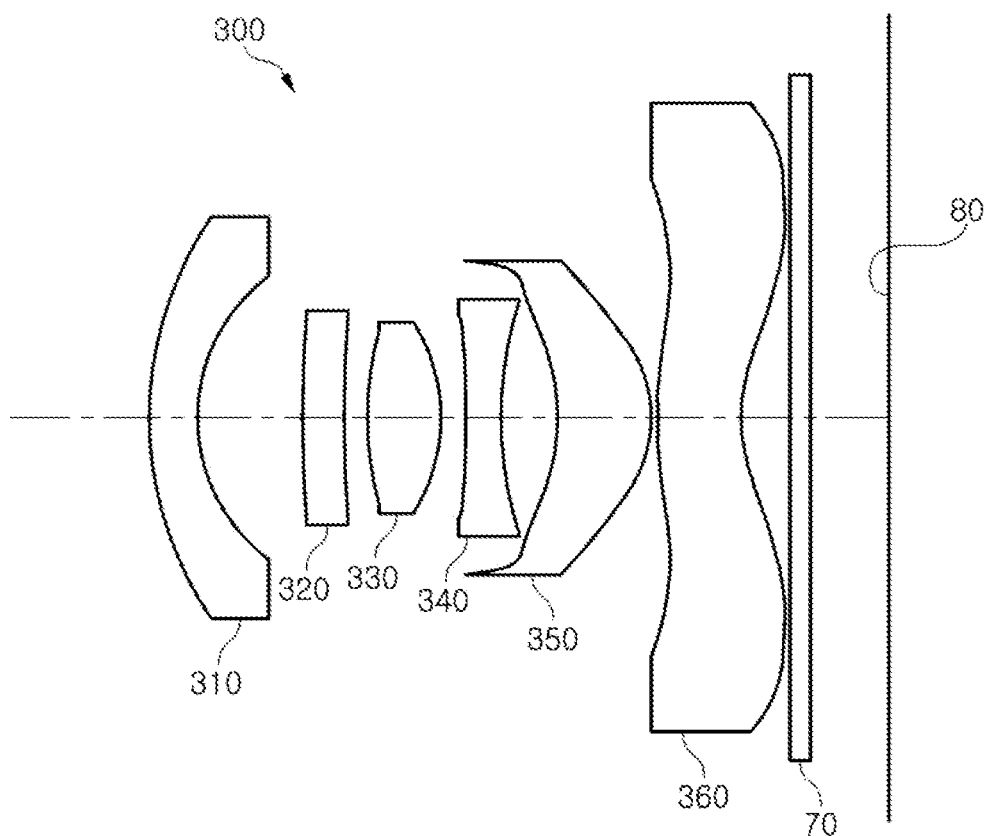
FIG. 11 illustrates a view of a lens module according to a third embodiment.

A lens module, according to a third embodiment, will be described with reference to FIG. 11.

A lens module 300 includes an optical system including a first lens 310, a second lens 320, a third lens 330, a fourth lens 340, a fifth lens 350, and a sixth lens 360. In addition, the lens module 300 further includes an infrared cut-off filter 70 and an image sensor 80. Further, the lens module 300 includes a stop (ST). For example, the stop is disposed between the second and third lenses.

In an embodiment, the first lens 310 has a negative refractive power, and an object-side surface thereof is convex and an image-side surface thereof is concave. The second lens 320 has a positive refractive power, and an object-side surface thereof is convex and an image-side surface thereof is concave. The third lens 330 has a positive refractive power, and an object-side surface thereof is convex and an image-side surface thereof is convex. The fourth lens 340 has a negative refractive power, and an object-side surface thereof is concave and an image-side surface thereof is concave. The fifth lens 350 has a positive refractive power, and an object-side surface thereof is concave and an image-side surface thereof is convex. The sixth lens 360 has a negative refractive power, and an object-side surface thereof is convex and an image-side surface thereof is concave. In addition, the sixth lens 360 has an aspherical surface shape in which inflection points are formed on an object-side surface and an image-side surface thereof, respectively.

In an embodiment, the second lens 320, the third lens 330, and the fifth lens 350 have positive refractive power. In an example, a focal length (f2) of the second lens 320, a focal length (f3) of the third lens 330, and a focal length (f5) of the fifth lens 350 have the following relationship thereamong. For example, the third lens 330 has a refractive power stronger than the refractive power of the second and fifth lenses 320 and 350.

$$f3 < f5 < f2 \qquad \text{[Relational Expression 5]}$$

In the present exemplary embodiment, the first lens 310, the fourth lens 340, and the sixth lens 360 may have negative refractive power. Here, a focal length (f1) of the first lens 310, a focal length (f4) of the fourth lens 340, and a focal length (f6) of the sixth lens 360 may have the following relationship thereamong:

$$f1 < f4 < f6. \qquad \text{[Relational Expression 6]}$$

Figure 12:
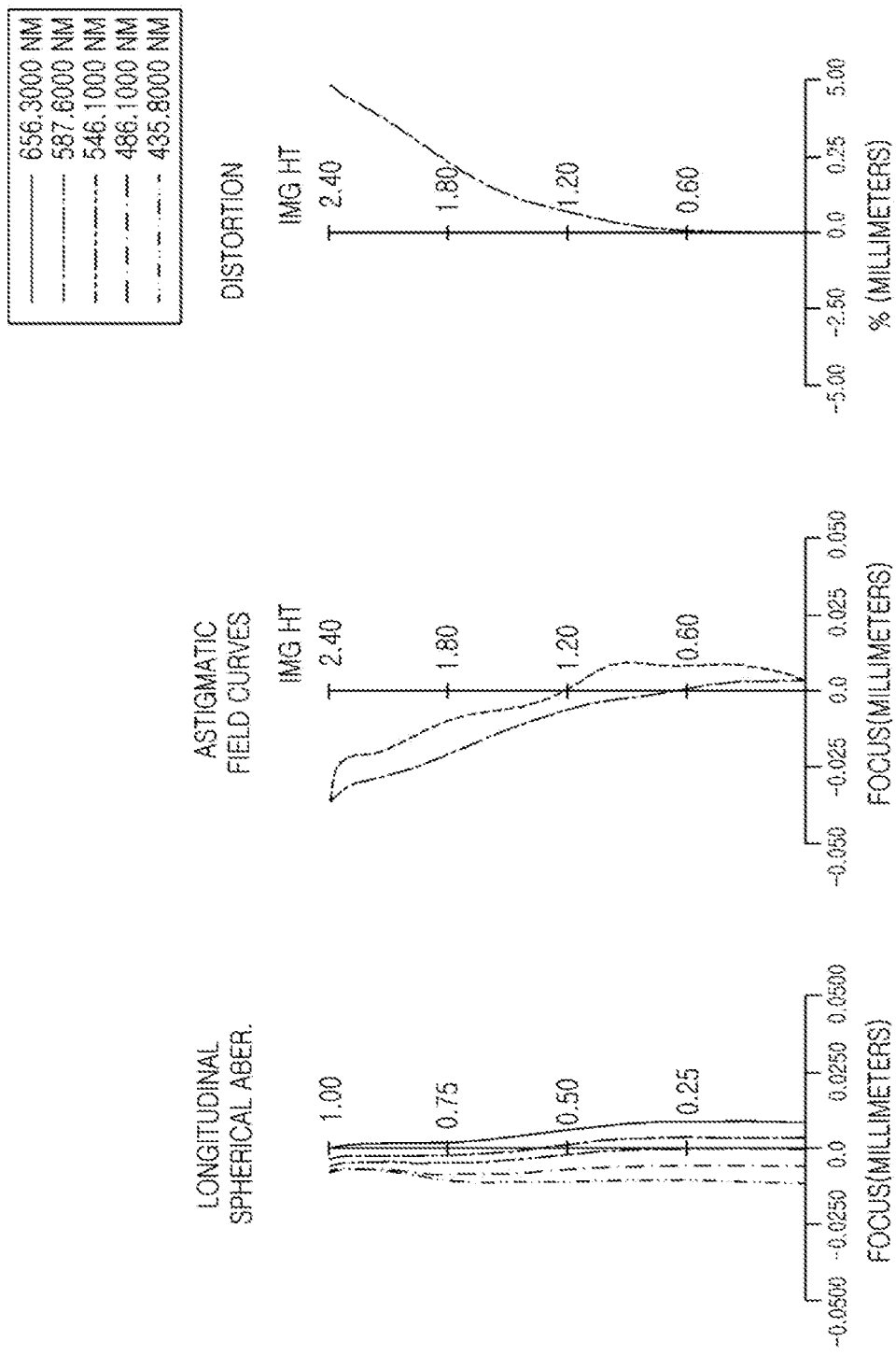
FIG. 12 illustrates graphs having curves representing aberration characteristics of the lens module illustrated in FIG. 11.
Figure 13:
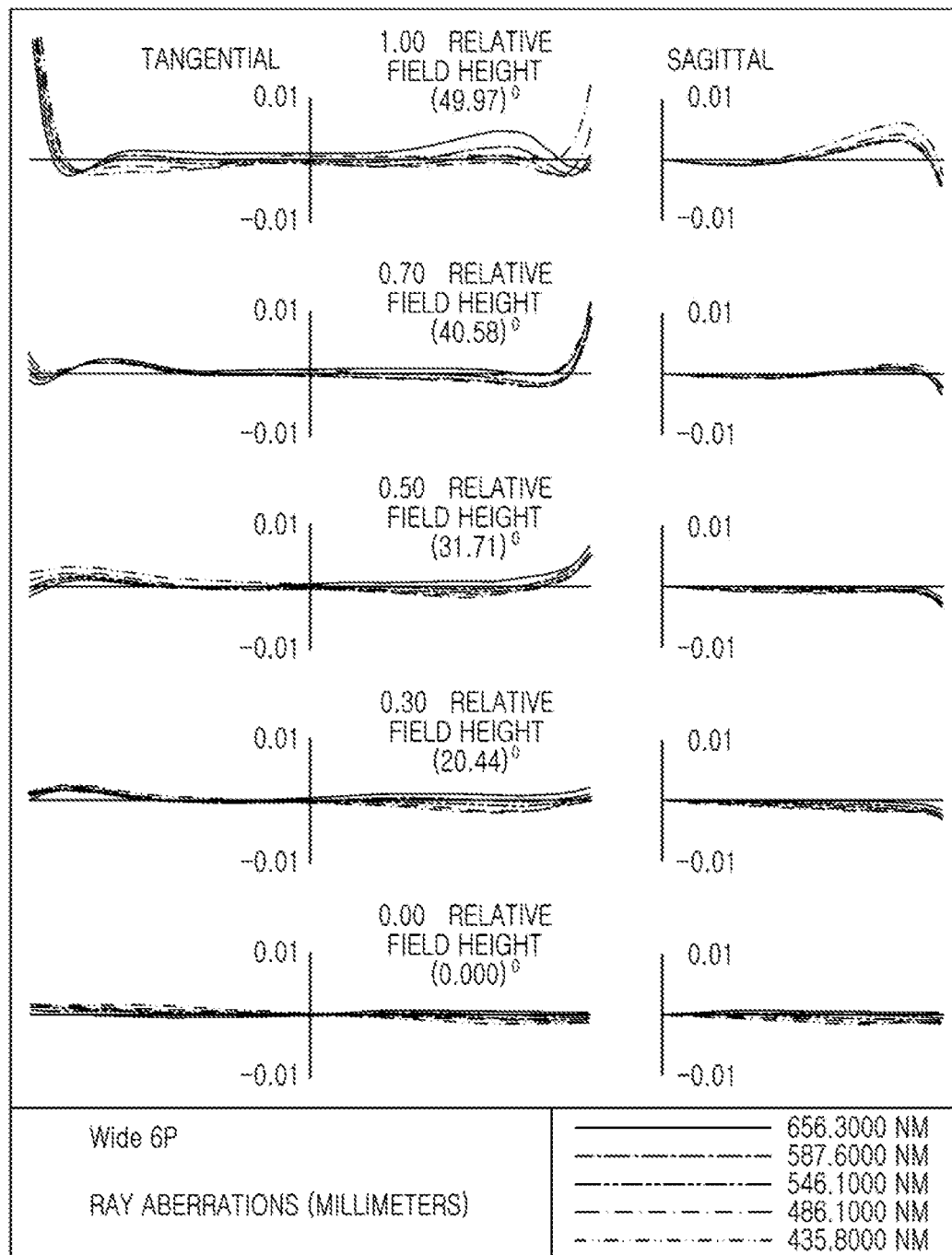
FIG. 13 illustrates graphs having curves representing MTF characteristics of the lens module illustrated in FIG. 11.

FIGS. 12 and 13 are graphs having curves representing aberration characteristics and MTF characteristics of the lens module, in accordance with an embodiment.

FIG. 14 is a table representing characteristics of the lenses configuring the lens module. In FIG. 14, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 to S12 represent first and second surfaces of the third to sixth lenses, respectively. In addition, Surface Nos. S13 and S14 represent first and second surfaces of the infrared cut-off filter.

FIG. 15 is a table representing conic constants and aspheric coefficients of the lenses configuring the lens module, in accordance with an embodiment. In FIG. 15, S1 to S12 represent Surface Nos. of corresponding surfaces of the first through sixth lenses, and K and A to G represent conic constants (K) and aspheric coefficients (A to G) of corresponding surfaces of the first through sixth lenses.

Figure 16:
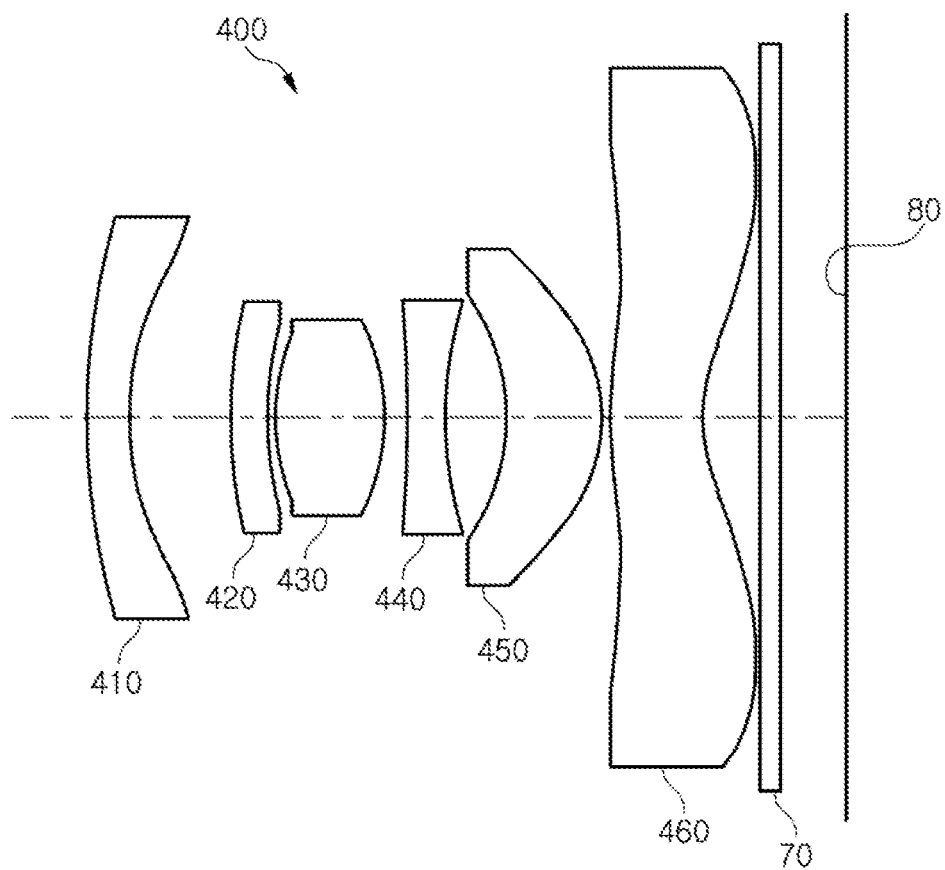
FIG. 16 illustrates a view of a lens module, according to a fourth embodiment.

A lens module, according to a fourth embodiment, will be described with reference to FIG. 16.

A lens module 400 includes an optical system including a first lens 410, a second lens 420, a third lens 430, a fourth lens 440, a fifth lens 450, and a sixth lens 460. In addition, the lens module 400 further includes an infrared cut-off filter 70 and an image sensor 80. Further, the lens module 400 includes a stop (ST). For example, the stop is disposed between the second and third lenses.

In an embodiment, the first lens 410 has a negative refractive power, and an object-side surface thereof is convex and an image-side surface thereof is concave. The second lens 420 has a negative refractive power, and an object-side surface thereof is convex and an image-side surface thereof is concave. The third lens 430 has a positive refractive power, and an object-side surface thereof is convex and an image-side surface thereof is convex. The fourth lens 440 has a negative refractive power, and an object-side surface thereof is concave and an image-side surface thereof is concave. The fifth lens 450 has a positive refractive power, and an object-side surface thereof is concave and an image-side surface thereof is convex. The sixth lens 460 has a negative refractive power, and an object-side surface thereof is convex and an image-side surface thereof is concave. In addition, the sixth lens 460 has an aspherical surface shape in which inflection points are formed on an object-side surface and an image-side surface thereof, respectively.

In an embodiment, the third and fifth lenses 430 and 450 have positive a refractive power. In an example, a focal length (f3) of the third lens 430 and a focal length (f5) of the fifth lens 450 have the following relationship therebetween. For example, the third lens 430 has a refractive power stronger than that of the fifth lens 450.

$$f3 < f5$$ [Relational Expression 7]

In an embodiment, the first lens 410, the second lens 420, the fourth lens 440, and the sixth lens 460 have negative refractive power. Here, a focal length (f1) of the first lens 410, a focal length (f2) of the second lens 420, a focal length (f4) of the fourth lens 440, and a focal length (f6) of the sixth lens 460 may have the following relationship thereamong:

$$f2 < f1 < f4 < f6.$$ [Relational Expression 8]

Figure 17:
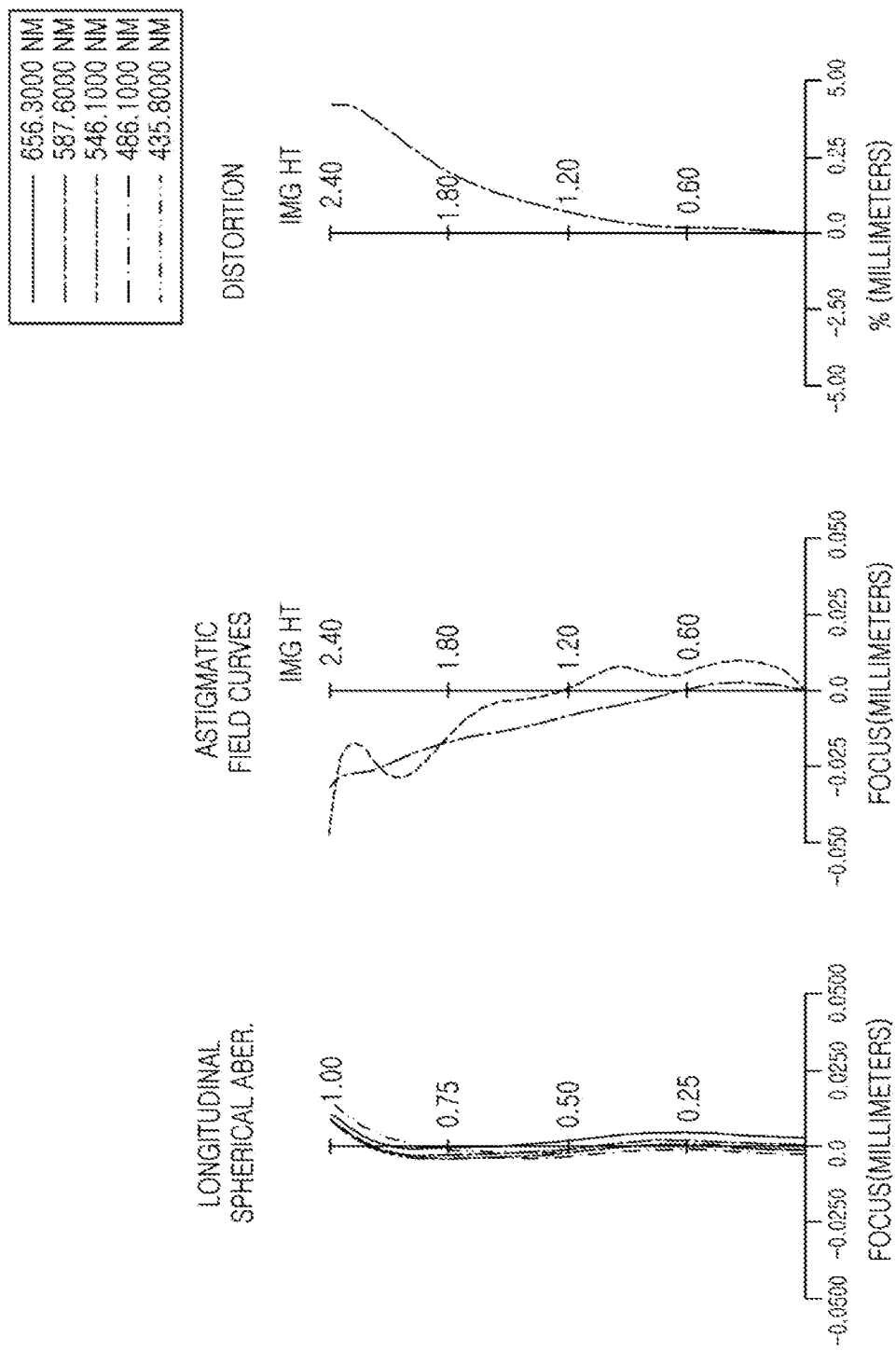
FIG. 17 illustrates graphs having curves representing aberration characteristics of the lens module illustrated in FIG. 16.
Figure 18:
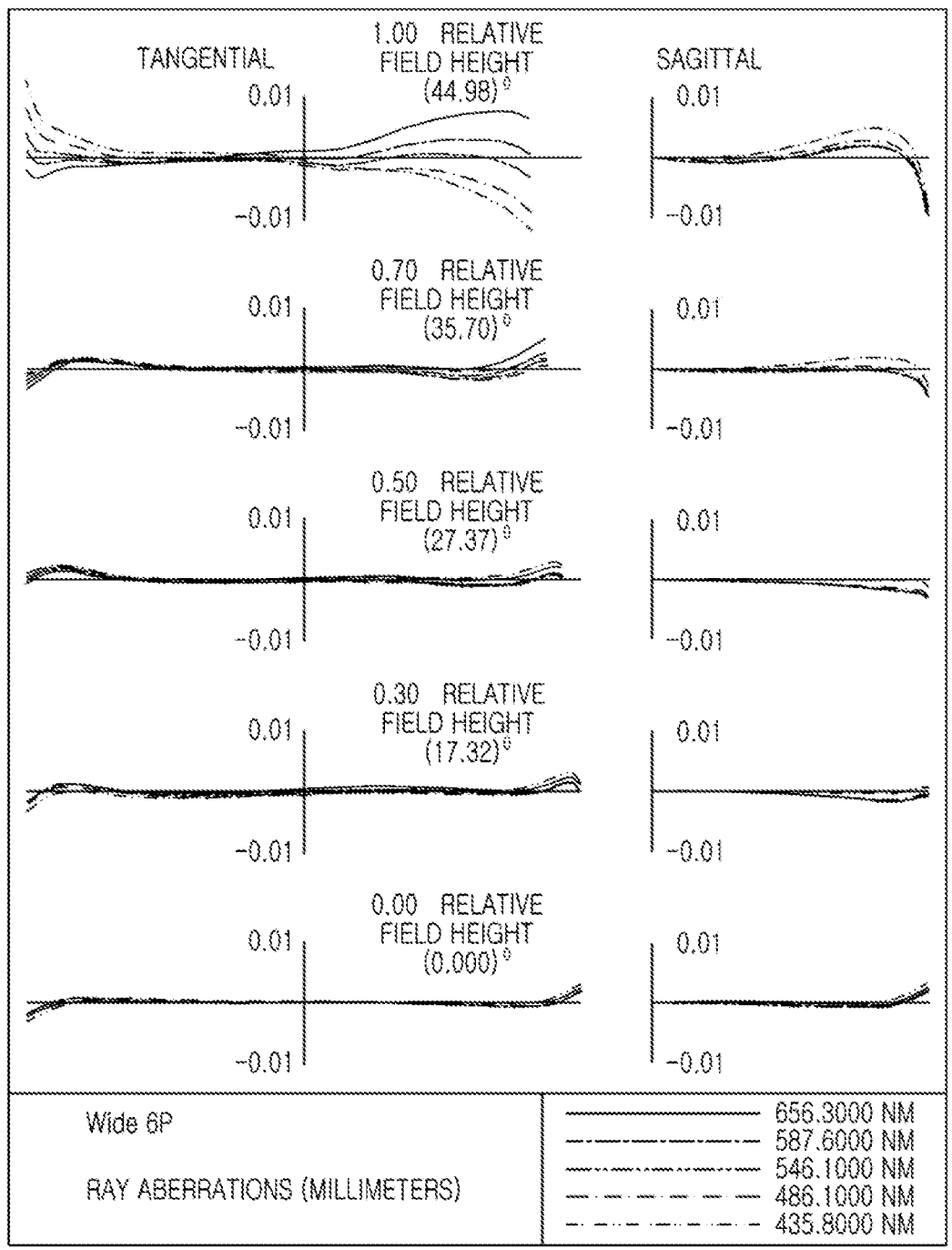
FIG. 18 illustrates graphs having curves representing MTF characteristics of the lens module illustrated in FIG. 16.

FIGS. 17 and 18 are graphs having curves representing aberration characteristics and MTF characteristics of the lens module, in accordance with an embodiment.

FIG. 19 is a table representing characteristics of the lenses configuring the lens module, in accordance with an embodiment. In FIG. 19, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 to S12 represent first and second surfaces of the third through sixth lenses, respectively. In addition, Surface Nos. S13 and S14 represent first and second surfaces of the infrared cut-off filter.

FIG. 20 is a table representing conic constants and aspheric coefficients of the lenses configuring the lens module, in accordance with an embodiment. In FIG. 20, S1 to S12 indicate Surface Nos. of corresponding surfaces of the first through sixth lenses, and K and A to G indicate conic constants (K) and aspheric coefficients (A to G) of corresponding surfaces of the first through sixth lenses.

Figure 21:
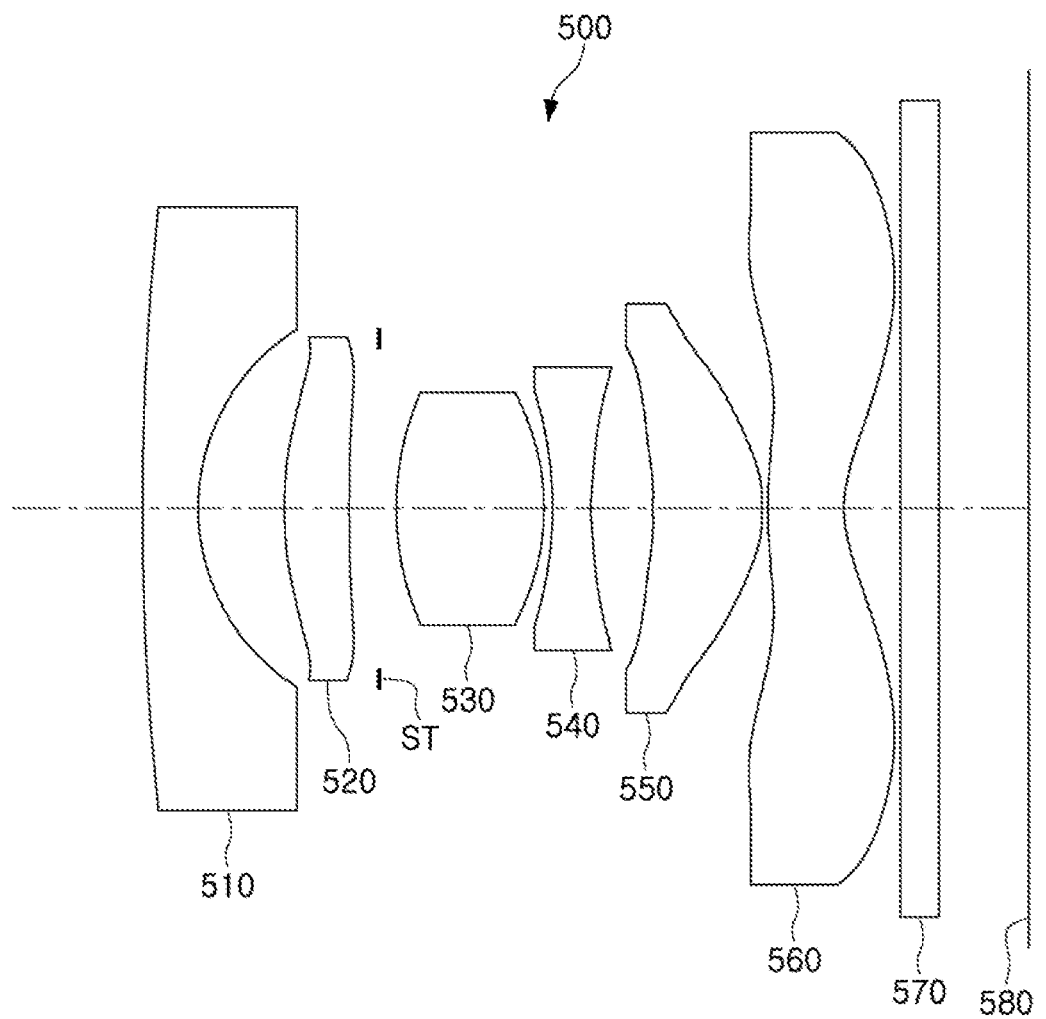
FIG. 21 illustrates a view of a lens module, according to a fifth embodiment.

A lens module, according to a fifth embodiment, will be described with reference to FIG. 21.

A lens module 500 includes an optical system including a first lens 510, a second lens 520, a third lens 530, a fourth lens 540, a fifth lens 550, and a sixth lens 560. In addition, the lens module 300 further includes an infrared cut-off filter 570 and an image sensor 580. Further, the lens module 300 includes a stop (ST). For example, the stop is disposed between the second and third lenses.

In an embodiment, the first lens 510 has a negative refractive power, and an object-side surface thereof is convex and an image-side surface thereof is concave. The second lens 520 has a positive refractive power, and an object-side surface thereof is convex and an image-side surface thereof is concave. The third lens 530 has a positive refractive power, and an object-side surface thereof is convex and an image-side surface thereof is convex. The fourth lens 540 has a negative refractive power, and an object-side surface thereof is concave and an image-side surface thereof is concave. The fifth lens 550 has a positive refractive power, and an object-side surface thereof is concave and an image-side surface thereof is convex. The sixth lens 560 has a negative refractive power, and an object-side surface thereof is convex and an image-side surface thereof is concave. In addition, the sixth lens 560 has an aspherical surface shape in which inflection points are formed on an object-side surface and an image-side surface thereof, respectively.

In an embodiment, the second lens 520, the third lens 530, and the fifth lens 550 have positive refractive power. In an example, a focal length (f2) of the second lens 520, a focal length (f3) of the third lens 530, and a focal length (f5) of the fifth lens 550 have the following relationship thereamong. For example, the third lens 530 has a refractive power stronger than the refractive power of the second and fifth lenses 520 and 550.

$$f2 < f5 < f3$$ [Relational Expression 5]

In the present exemplary embodiment, the first lens 510, the fourth lens 540, and the sixth lens 560 may have negative refractive power. Here, a focal length (f1) of the first lens 510, a focal length (f4) of the fourth lens 540, and a focal length (f6) of the sixth lens 560 may have the following relationship thereamong:

$$f4 < f1 < f6.$$ [Relational Expression 6]

Figure 22:
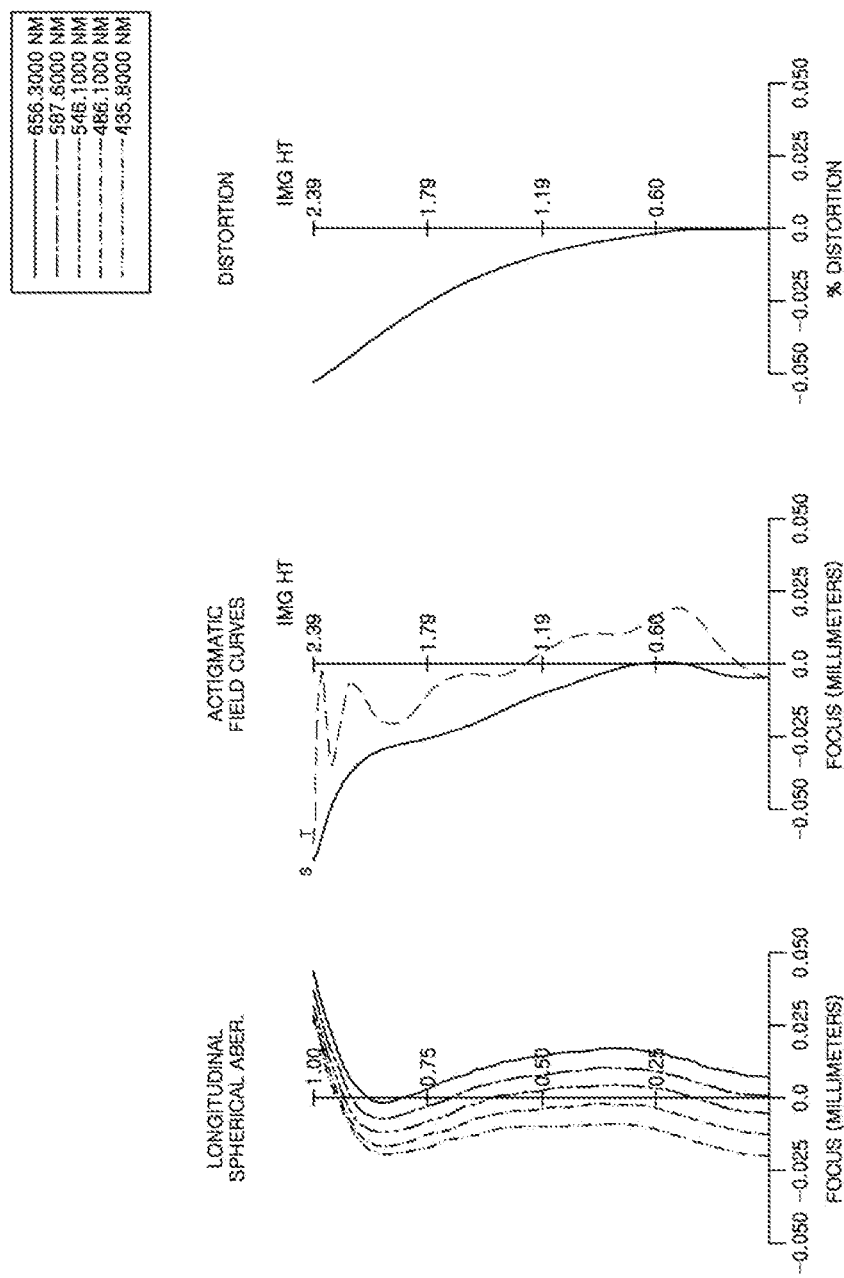
FIG. 22 illustrates graphs having curves representing aberration characteristics of the lens module illustrated in FIG. 21.
Figure 23:
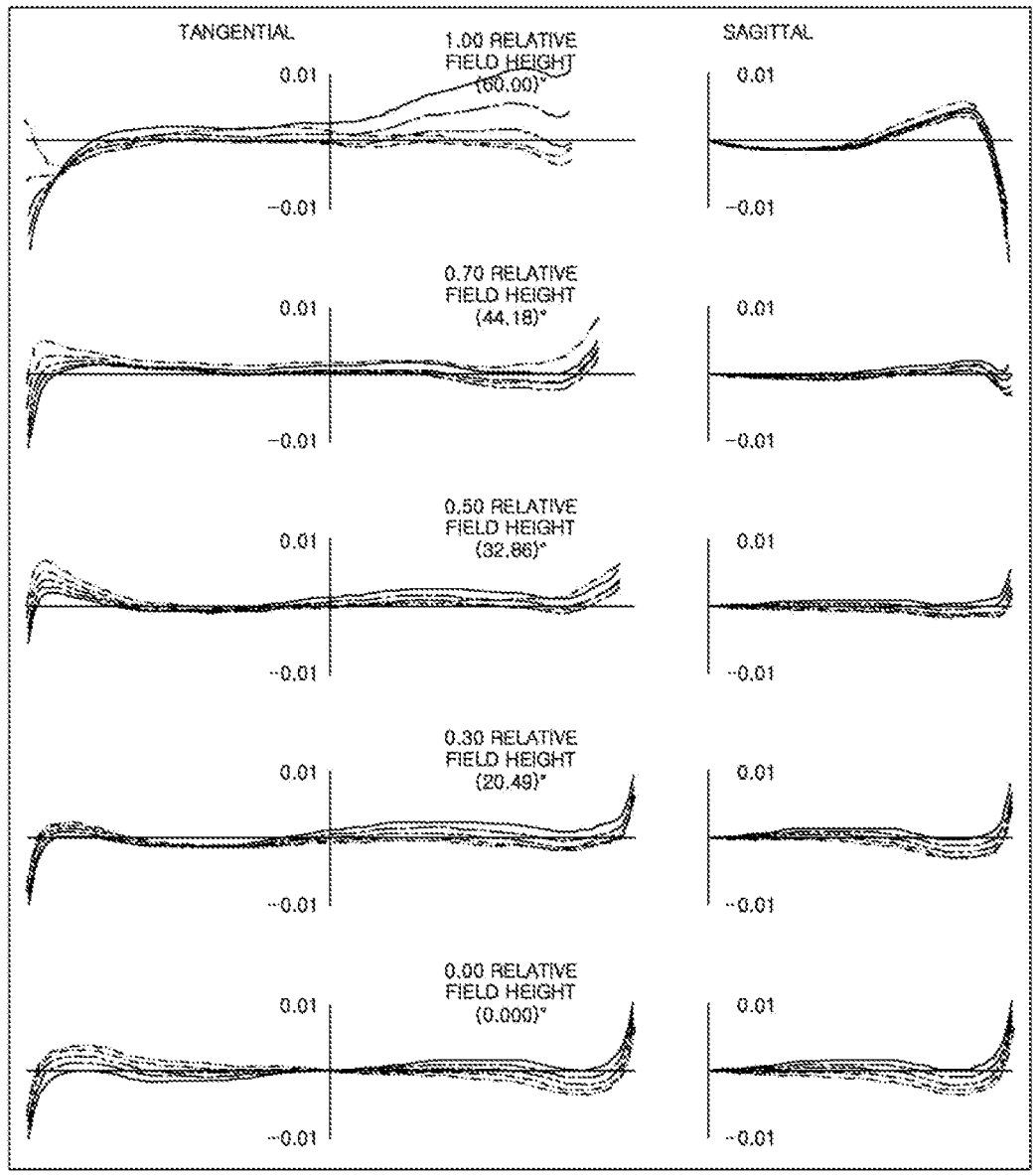
FIG. 23 illustrates graphs having curves representing MTF characteristics of the lens module illustrated in FIG. 21.

FIGS. 22 and 23 are graphs having curves representing aberration characteristics and MTF characteristics of the lens module, in accordance with an embodiment.

FIG. 24 is a table representing characteristics of the lenses configuring the lens module. In FIG. 24, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 to S12 represent first and second surfaces of the third to sixth lenses, respectively. In addition, Surface Nos. S13 and S14 represent first and second surfaces of the infrared cut-off filter.

FIG. 25 is a table representing conic constants and aspheric coefficients of the lenses configuring the lens module, in accordance with an embodiment. In FIG. 25, S1 to S12 represent Surface Nos. of corresponding surfaces of the first through sixth lenses, and K and A to G represent conic constants (K) and aspheric coefficients (A to G) of corresponding surfaces of the first through sixth lenses.

Figure 26:
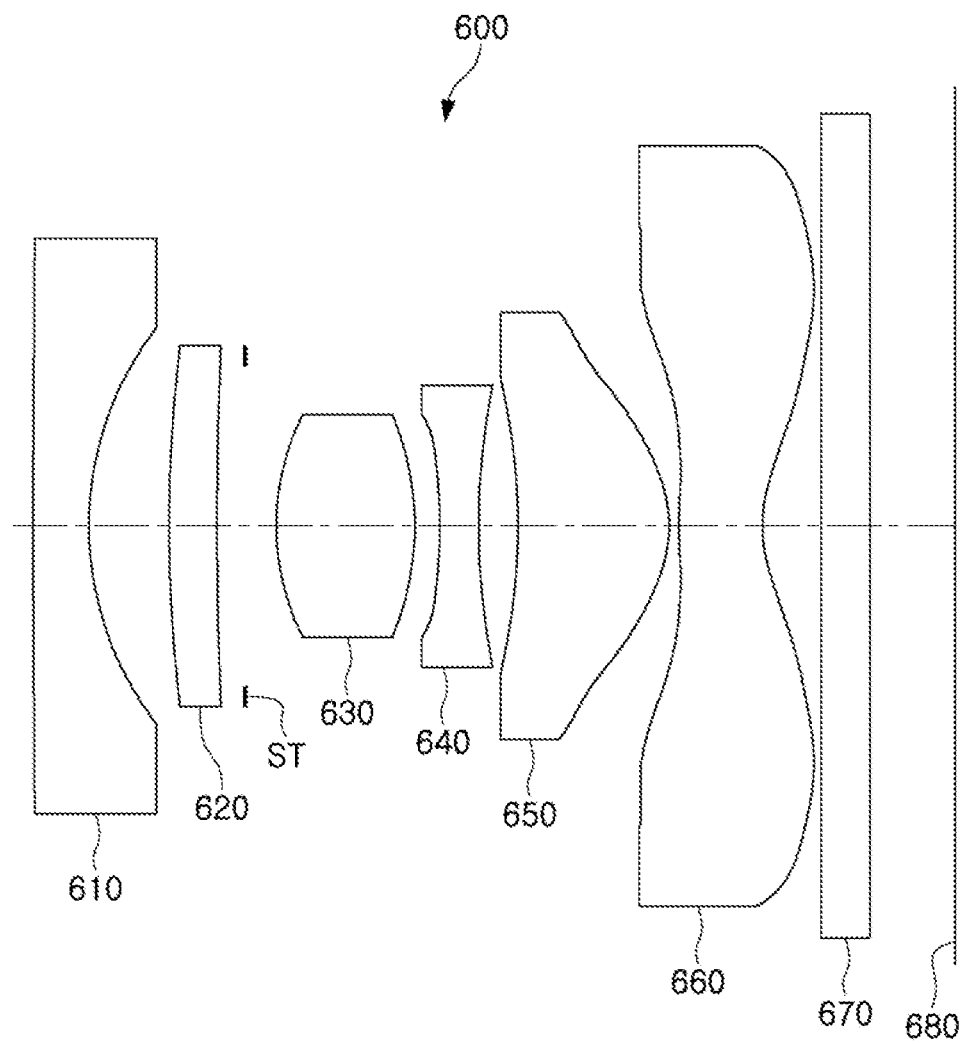
FIG. 26 illustrates a view of a lens module, according to a sixth embodiment.

A lens module, according to a sixth embodiment, will be described with reference to FIG. 26.

A lens module 600 includes an optical system including a first lens 610, a second lens 620, a third lens 630, a fourth lens 640, a fifth lens 650, and a sixth lens 660. In addition, the lens module 300 further includes an infrared cut-off filter 670 and an image sensor 680. Further, the lens module 300 includes a stop (ST). For example, the stop is disposed between the second and third lenses.

In an embodiment, the first lens 610 has a negative refractive power, and an object-side surface thereof is convex and an image-side surface thereof is concave. The second lens 620 has a positive refractive power, and an object-side surface thereof is convex and an image-side surface thereof is concave. The third lens 630 has a positive refractive power, and an object-side surface thereof is convex and an image-side surface thereof is convex. The fourth lens 640 has a negative refractive power, and an object-side surface thereof is concave and an image-side surface thereof is concave. The fifth lens 650 has a positive refractive power, and an object-side surface thereof is concave and an image-side surface thereof is convex. The sixth lens 660 has a negative refractive power, and an object-side surface thereof is convex and an image-side surface thereof is concave. In addition, the sixth lens 660 has an aspherical surface shape in which inflection points are formed on an object-side surface and an image-side surface thereof, respectively.

In an embodiment, the second lens 620, the third lens 630, and the fifth lens 650 have positive refractive power. In an example, a focal length (f2) of the second lens 620, a focal length (f3) of the third lens 630, and a focal length (f5) of the fifth lens 650 have the following relationship thereamong. For example, the fifth lens 650 has a refractive power stronger than the refractive power of the second and third lenses 620 and 630.

$$f2 < f3 < f5.$$ [Relational Expression 5]

In the present exemplary embodiment, the first lens 610, the fourth lens 640, and the sixth lens 660 may have negative refractive power. Here, a focal length (f1) of the first lens 610, a focal length (f4) of the fourth lens 640, and a focal length (f6) of the sixth lens 660 may have the following relationship thereamong:

$$f4 < f1 < f6.$$ [Relational Expression 6]

Figure 27:
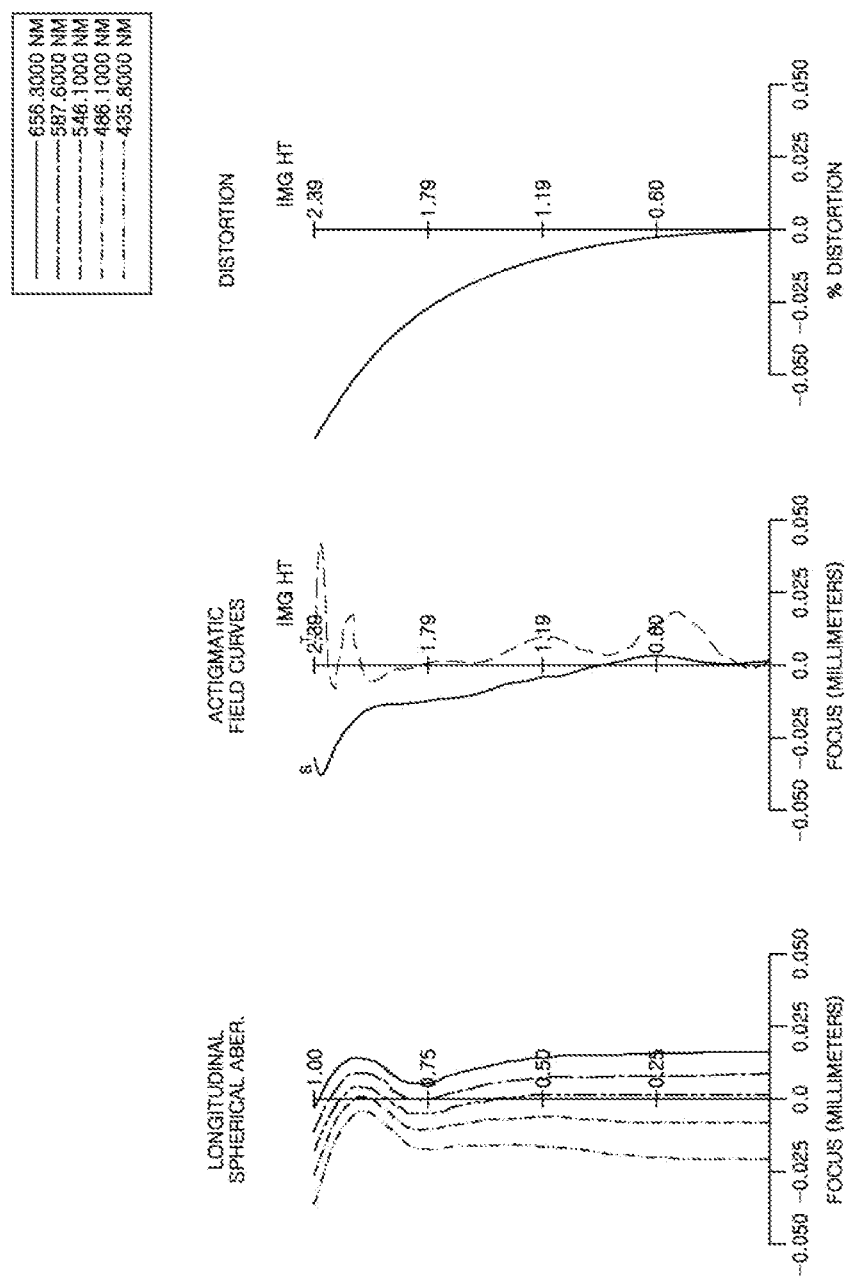
FIG. 27 illustrates graphs having curves representing aberration characteristics of the lens module illustrated in FIG. 26.
Figure 28:
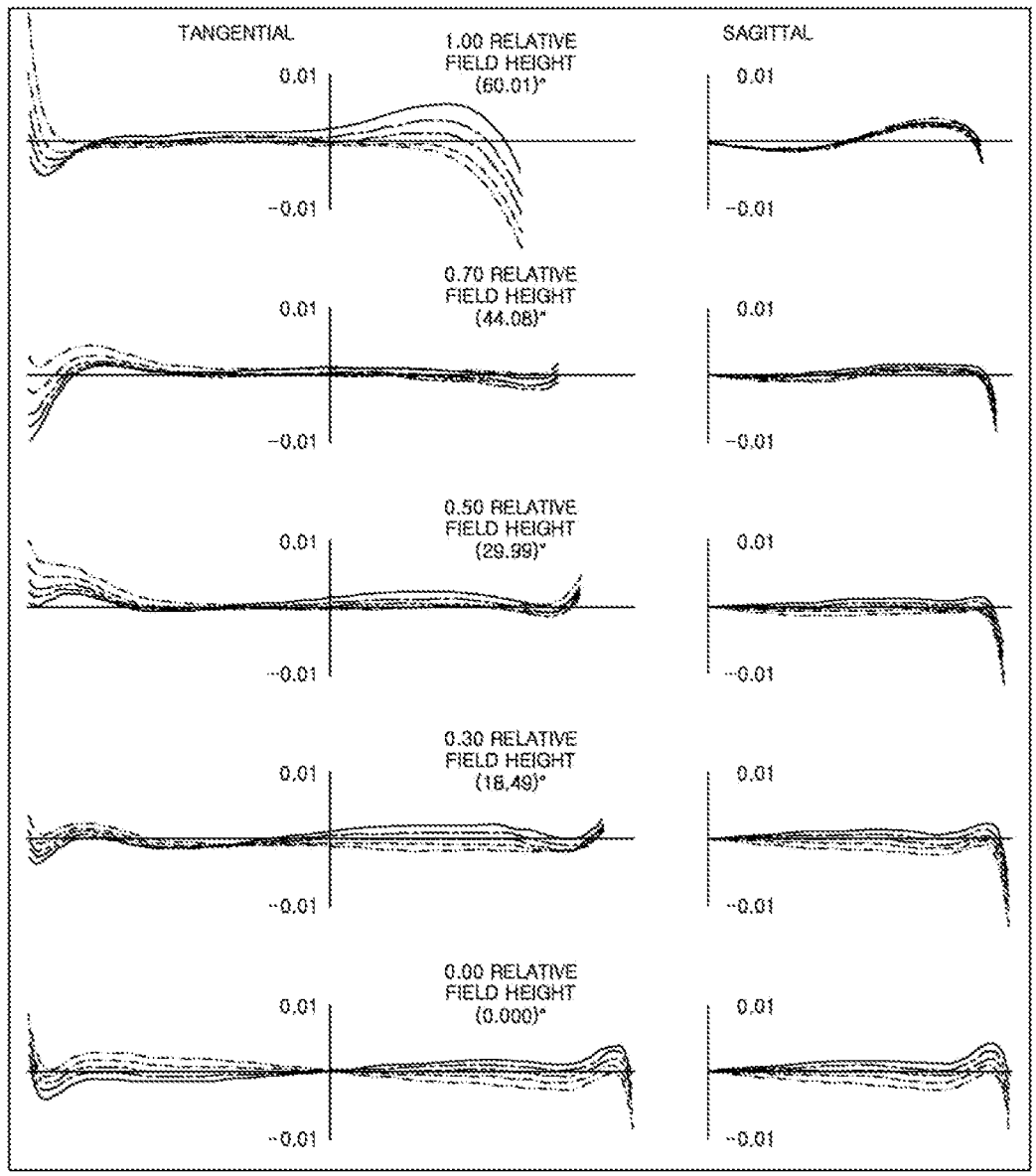
FIG. 28 illustrates graphs having curves representing MTF characteristics of the lens module illustrated in FIG. 26.

FIGS. 27 and 28 are graphs having curves representing aberration characteristics and MTF characteristics of the lens module, in accordance with an embodiment.

FIG. 29 is a table representing characteristics of the lenses configuring the lens module. In FIG. 29, Surface Nos. S1 and S2 represent the first surface (object-side surface) and the second surface (image-side surface) of the first lens, and Surface Nos. S3 and S4 represent the first and second surfaces of the second lens. Similarly, Surface Nos. S5 to S12 represent first and second surfaces of the third to sixth lenses, respectively. In addition, Surface Nos. S13 and S14 represent first and second surfaces of the infrared cut-off filter.

FIG. 30 is a table representing conic constants and aspheric coefficients of the lenses configuring the lens module, in accordance with an embodiment. In FIG. 30, S1 to S12 represent Surface Nos. of corresponding surfaces of the first through sixth lenses, and K and A to G represent conic constants (K) and aspheric coefficients (A to G) of corresponding surfaces of the first through sixth lenses.

Table 1 represents optical characteristics of the lens modules, according to the first to sixth embodiments. The lens module has an overall focal length (f) of 1.8 to 2.4. A focal length (f1) of the first lens is determined to be in a range of −7.0 to −2.0. A focal length (f2) of the second lens is determined to be in a range of −48 or more. A focal length (f3) of the third lens is determined to be in a range of 1.3 to 1.6. A focal length (f4) of the fourth lens is determined to be in a range of −5.0 to −2.0. A focal length (f5) of the fifth lens is determined to be in a range of 1.3 to 2.6. A focal length (f6) of the sixth lens is determined to be in a range of −3.0 to −1.0.

An overall length (TTL) of the optical system is determined to be in a range of 4.4 to 5.1. A field of view (FOV) of the lens module is determined to be in a range of 90 to 120.

TABLE 1

| Remarks | First Embodiment | Second Embodiment | Third Embodiment | Fourth Embodiment | Fifth Embodiment | Sixth Embodiment |
|---|---|---|---|---|---|---|
| f | 2.326 | 2.298 | 1.852 | 2.208 | 1.856 | 2.083 |
| f1 | −5.895 | −5.573 | −4.020 | −6.339 | −2.203 | −3.279 |
| f2 | −41.16 | −37.38 | 11.11 | −46.54 | 4.76 | 10.91 |
| f3 | 1.419 | 1.414 | 1.469 | 1.435 | 1.431 | 1.560 |
| f4 | −3.893 | −4.005 | −3.686 | −3.831 | −2.993 | −3.520 |
| f5 | 2.441 | 2.413 | 2.071 | 2.446 | 1.700 | 1.423 |
| f6 | −2.468 | −2.515 | −2.634 | −2.548 | −1.826 | −1.397 |
| TTL | 4.502 | 4.500 | 4.500 | 4.500 | 4.800 | 5.000 |
| FOV | 91.79 | 92.48 | 104.68 | 94.76 | 120.00 | 120.00 |
| ImgH | 2.400 | 2.400 | 2.400 | 2.400 | 2.390 | 2.390 |

Tables 1 and 2 represent numerical ranges of Conditional Expressions and values of Conditional Expressions 1 through 7 of the lens modules according to the first through sixth embodiments.

TABLE 2

| Conditional Expressions | First Embodiment | Second Embodiment | Third Embodiment | Fourth Embodiment | Fifth Embodiment | Sixth Embodiment |
|---|---|---|---|---|---|---|
| d4/d3 | 0.132 | 0.137 | 0.570 | 0.201 | 0.706 | 1.271 |
| (r3 + r4)/(r3 − r4) | 1.304 | 1.317 | 3.650 | 1.503 | 5.795 | −8.383 |

As seen in Tables 1 and 2, the lens modules, according to the first to sixth embodiments, satisfy all of the Conditional Expressions 1 through 7.

As set forth above, according to embodiments, the optical system has a high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
a first lens;
a second lens comprising a negative refractive power;
a third lens comprising a convex object-side surface and a convex image-side surface;
a fourth lens comprising a concave object-side surface and a concave image-side surface;
a fifth lens comprising a concave object-side surface; and
a sixth lens comprising an inflection point formed on an image-side surface thereof,
wherein the first to sixth lenses are sequentially disposed from an object side to an image side.

2. The lens module of claim 1, wherein the first lens comprises a meniscus shape with a convex object-side surface.

3. The lens module of claim 1, wherein the second lens comprises a meniscus shape with a convex object-side surface.

4. The lens module of claim 1, wherein the fifth lens comprises a convex image-side surface.

5. The lens module of claim 1, wherein the sixth lens comprises a convex object-side surface.

6. The lens module of claim 1, wherein the sixth lens comprises a concave image-side surface.

7. The lens module of claim 1, further comprising:
a stop positioned between the second and third lenses.

8. The lens module of claim 1, wherein 80<FOV≤120 is satisfied,
where FOV is a field of view of an optical system comprising the first to sixth lenses.

9. The lens module of claim 1, wherein 15<V2 is satisfied, where V2 is an Abbe number of the second lens.

10. The lens module of claim 1, wherein the first lens comprises a negative refractive power, the third lens comprises a positive refractive power, the fourth lens comprises a negative refractive power, the fifth lens comprises a positive refractive power, and the sixth lens comprises a negative refractive power.

11. The lens module of claim 1, wherein the third lens has a refractive power stronger than a refractive power of the fifth lens.

12. The lens module of claim 1, wherein the third lens has a refractive power stronger than a refractive power of the second lens and fifth lens.

13. The lens module of claim 1, wherein the image-side surface of the sixth lens is concave in a paraxial region and gradually curves to be convex at an edge portion thereof.

14. A lens module, comprising:
a first lens comprising a negative refractive power;
a second lens comprising a negative refractive power;
a third lens comprising a positive refractive power;
a fourth lens comprising a negative refractive power;
a fifth lens comprising a refractive power and a concave object-side surface; and
a sixth lens comprising a negative refractive power,
wherein the first to sixth lenses are sequentially disposed from an object side to an image side, and
wherein d4/d3<0.7 is satisfied,
where d3 is a thickness of the second lens, and
d4 is a distance from an image-side surface of the second lens to an object-side surface of the third lens.

15. The lens module of claim 14, wherein the fifth lens comprises a positive refractive power.

16. The lens module of claim 14, wherein the fourth lens comprises a concave object-side surface.

17. The lens module of claim 14, wherein the third lens is a convex object-side surface and a convex image-side surface.

18. The lens module of claim 14, wherein the fourth lens comprises a concave image-side surface.

19. The lens module of claim 14, wherein 1.0<(r3+r4)/(r3−r4) is satisfied,
where r3 is a radius of curvature of an object-side surface of the second lens, and
r4 is a radius of curvature of an image-side surface of the second lens.

20. A lens module, comprising:
a first lens;
a second lens comprising a positive refractive power;
a third lens comprising a convex object-side surface and a convex image-side surface;
a fourth lens comprising a concave object-side surface and a concave image-side surface;
a fifth lens comprising a concave object-side surface; and
a sixth lens comprising an inflection point formed on an image-side surface thereof,
wherein the first to sixth lenses are sequentially disposed from an object side to an image side, and
wherein d4/d3<0.7 is satisfied,
where d3 is a thickness of the second lens, and
d4 is a distance from an image-side surface of the second lens to an object-side surface of the third lens.

21. A lens module, comprising:
a first lens comprising a negative refractive power;
a second lens comprising a negative refractive power;
a third lens comprising a positive refractive power;
a fourth lens comprising a negative refractive power;
a fifth lens comprising a refractive power and a concave object-side surface; and
a sixth lens comprising a negative refractive power,
wherein the first to sixth lenses are sequentially disposed from an object side to an image side, and
wherein $1.0<(r3+r4)/(r3-r4)$ is satisfied,
where r3 is a radius of curvature of an object-side surface of the second lens, and
r4 is a radius of curvature of an image-side surface of the second lens.

* * * * *